United States Patent
Tsuneki et al.

(10) Patent No.: US 11,256,220 B2
(45) Date of Patent: Feb. 22, 2022

(54) MACHINE LEARNING DEVICE, CONTROL DEVICE AND MACHINE LEARNING METHOD

(71) Applicant: FANUC CORPORATION, Yamanashi (JP)

(72) Inventors: Ryoutarou Tsuneki, Yamanashi (JP); Satoshi Ikai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 56 days.

(21) Appl. No.: 16/822,576

(22) Filed: Mar. 18, 2020

(65) Prior Publication Data

US 2020/0326670 A1 Oct. 15, 2020

(30) Foreign Application Priority Data

Apr. 15, 2019 (JP) .............................. JP2019-076851

(51) Int. Cl.
*G05B 13/02* (2006.01)

(52) U.S. Cl.
CPC ................. *G05B 13/0265* (2013.01)

(58) Field of Classification Search
CPC ...... G05B 13/0265; G05B 2219/41152; G05B 2219/33056; G05B 19/404; G05B 2219/37498
See application file for complete search history.

(56) References Cited

U.S. PATENT DOCUMENTS

| 2017/0123385 A1* | 5/2017 | Iijima | G05B 19/402 |
| 2020/0133226 A1* | 4/2020 | Tsuneki | G05B 19/402 |

FOREIGN PATENT DOCUMENTS

| JP | 62-126402 | 6/1987 |
| JP | 07-261853 | 10/1995 |
| JP | 2013-126266 | 6/2013 |

(Continued)

OTHER PUBLICATIONS

Huang, Min Gao. "The restraining of machine vibration based on the optimized servo control." Applied Mechanics and Materials 184(2012): 1592. (Year: 2012).*

(Continued)

*Primary Examiner* — Michael D Masinick
(74) *Attorney, Agent, or Firm* — Wenderoth, Lind & Ponack, L.L.P.

(57) ABSTRACT

A machine learning device that performs reinforcement learning for a servo control device and optimizes a coefficient of a filter for attenuating a specific frequency component provided in the servo control device includes a state information acquisition unit which acquires state information that includes the result of calculation of at least one of an input/output gain of the servo control device and a phase delay of input and output, the coefficient of the filter and conditions, and an action information output unit which outputs, to the filter, action information including adjustment information of the coefficient. A reward output unit determines evaluation values under the conditions based on the result of the calculation to output, as a reward, the value of a sum of the evaluation values. A value function updating unit updates an action value function based on the value of the reward, the state information and the action information.

8 Claims, 14 Drawing Sheets

(56) References Cited

FOREIGN PATENT DOCUMENTS

| | | |
|---|---|---|
| JP | 2017-022855 | 1/2017 |
| JP | 2017-034852 | 2/2017 |
| WO | 2018/151215 | 8/2018 |

OTHER PUBLICATIONS

Nagaoka, Kotaro, and Tomonori Sato. "Feedforward controller for continuous path control of CNC machine tools." Intl. J. on Simulation: Systems, Science & Technology 7.8 (2006): 39-46. (Year: 2006).*

Notification of Reasons for Refusal issued in corresponding JP Patent Application No. JP 2019-076851, dated Jun. 1, 2021.

\* cited by examiner

RISE OF INPUT/OUTPUT GAIN OF OTHER AXIS IS
CHANGED ACCORDING TO POSITION OF ONE AXIS

MACHINE LEARNING DEVICE, CONTROL DEVICE AND MACHINE LEARNING METHOD

This application is based on and claims the benefit of priority from Japanese Patent Application No. 2019-076851, filed on 15 Apr. 2019, the content of which is incorporated herein by reference.

BACKGROUND OF THE INVENTION

Field of the Invention

The present invention relates to a machine learning device which performs reinforcement learning for optimizing a coefficient of at least one filter that attenuates at least one specific frequency component provided in a servo control device for controlling a motor, to a control device which includes such a machine learning device and to a machine learning method.

Related Art

Devices which adjust the characteristic of a filter are disclosed in, for example, Patent Documents 1 to 4. Patent Document 1 discloses a vibration reduction device of a robot which includes: a robot axis drive source that is provided in each axis of the robot and that drives the robot axis according to an input control signal; and a signal processing means that removes, from the control signal, a frequency component corresponding to the natural frequency of the robot axis, and which applies, to the robot axis drive source, the control signal subjected to signal processing in the signal processing means so as to reduce vibrations generated in the robot axis. In the vibration reduction device of the robot, a neural network is provided which inputs the current position of each axis of the robot so as to operate and output the natural frequency of each axis of the robot and which applies this to the signal processing means, and the frequency component corresponding to the natural frequency of the robot axis output from the neural network is removed from the control signal. Patent Document 1 also discloses that the signal processing means is a notch filter and that a notch frequency is varied according to the natural frequency of the robot axis output from the neutral network.

Patent Document 2 discloses a control device of an XY stage in which movable guides that intersect each other vertically and laterally are arranged on a table and in which moving stages are arranged in the intersections thereof, and the control device of the XY stage includes: a variable notch filter which can variably set a notch frequency for absorbing the gain of the resonance motion of the moving stages; and a switching means which inputs the position information of the moving stages on the table and which outputs a switching signal for switching the notch frequency of the notch filter.

Patent Document 3 discloses a servo control device according to an embodiment which includes: command sampling that controls, based on a torque command or a current command, a servo amplifier for driving a motion member which performs a rotation motion or a reciprocation motion and that samples the torque command or the current command for the servo amplifier when a velocity control gain is adjusted; and an operation processing unit that converts, when the velocity control gain is adjusted, the sampling value of the torque command or the current command into the strength of the torque of the motion member at a frequency and that performs an oscillation band determination for determining that a frequency band where the strength of the torque of the motion member peaks is an oscillation band and a filter setting for setting a band stop filter so as to attenuate the strength of the torque of the motion member in the oscillation band when the velocity control gain is adjusted.

Patent Document 4 discloses a servo control device which includes: a velocity command calculation unit; a torque command calculation unit; a velocity detection unit; a velocity control loop; a velocity control loop gain setting unit; at least one filter that removes a specific band of torque command values; a sinusoidal disturbance input unit that performs a sinusoidal sweep on the velocity control loop; a frequency characteristic calculation unit that estimates the gain and the phase of a velocity control loop input/output signal; a resonant frequency detection unit; a filter adjustment unit that adjusts a filter according to a resonant frequency; a gain adjustment unit; a sequence control unit that automatically performs online the detection of the resonant frequency, the adjustment of a velocity control loop gain and the adjustment of the filter; and an adjustment state display unit, and in which the adjustment state display unit displays the adjustment stage and the progress of the sequence control unit.

Patent Document 1: Japanese Unexamined Patent Application, Publication No. H07-261853

Patent Document 2: Japanese Unexamined Patent Application, Publication No. S62-126402

Patent Document 3: Japanese Unexamined Patent Application, Publication No. 2013-126266

Patent Document 3: Japanese Unexamined Patent Application, Publication No. 2017-022855

SUMMARY OF THE INVENTION

In a case where when the characteristic of a filter such as a notch filter in a servo control device of one axis is determined, a machine characteristic is affected by the position of another axis or the velocity gain of a servo control device of the other axis, even if the characteristic of the filter is optimized with a certain position of the other axis or a certain velocity gain, oscillation may occur in the other position or the velocity gain. Even in a case where the machine characteristic is not affected by the position of the other axis, oscillation may occur depending on the position of the present axis. Hence, it is desired to perform the optimum adjustment of a filter characteristic even when a machine characteristic is changed by the position of the present axis or is affected by another axis.

(1) An aspect of the present disclosure is a machine learning device that performs reinforcement learning in which a servo control device for controlling a motor is driven under a plurality of conditions and which optimizes a coefficient of at least one filter for attenuating at least one specific frequency component provided in the servo control device, and the machine learning device includes: a state information acquisition unit which acquires state information that includes the result of calculation of a frequency characteristic calculation device for calculating at least one of an input/output gain of the servo control device and a phase delay of an input and an output, the coefficient of the filter and the conditions; an action information output unit which outputs, to the filter, action information including adjustment information of the coefficient included in the state information; a reward output unit which individually determines evaluation values under the conditions based on the result of the calculation so as to output, as a reward, the value of a sum of the evaluation values; and a value function updating unit which updates an action value function based on the value of the reward output by the reward output unit, the state information and the action information.

(2) Another aspect of the present disclosure is a control device which includes: the machine learning device of (1) described above; the servo control device which includes at least one filter for attenuating at least one specific frequency component and which controls the motor; and the frequency characteristic calculation device which calculates at least one of the input/output gains of the servo control device and the phase delay of the input and the output in the servo control device.

(3) Yet another aspect of the present disclosure is a machine learning method of a machine learning device that performs reinforcement learning in which a servo control device for controlling a motor is driven under a plurality of conditions and which optimizes a coefficient of at least one filter for attenuating at least one specific frequency component provided in the servo control device, and the machine learning method includes: acquiring state information that includes the result of calculation for calculating at least one of an input/output gains of the servo control device and a phase delay of an input and an output, the coefficient of the filter (130) and the conditions; outputting, to the filter, action information including adjustment information of the coefficient included in the state information; individually determining evaluation values under the conditions based on the result of the calculation so as to determine, as a reward, the value of a sum of the evaluation values; and updating an action value function based on the value of the reward determined, the state information and the action information.

In each of the aspects of the present disclosure, even when the machine characteristic of a machine tool, a robot, an industrial machine or the like is changed depending on conditions, for example, even when the machine characteristic is changed depending on the position of one axis or the machine characteristic is affected by another axis, it is possible to perform the optimum adjustment of a filter characteristic.

DETAILED DESCRIPTION OF THE INVENTION

An embodiment of the present disclosure will be described in detail below with reference to drawings.

Figure 1:
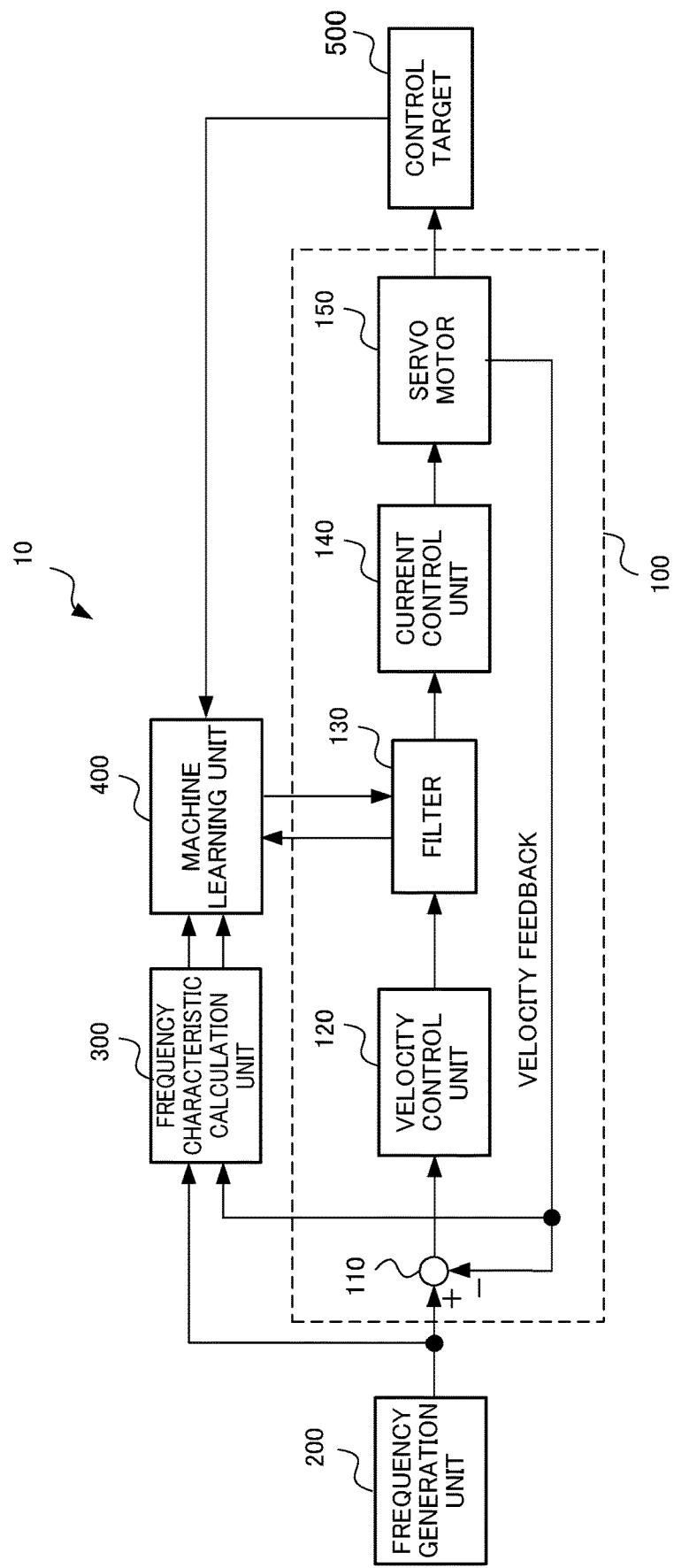
FIG. 1 is a block diagram showing a control device which includes a machine learning device according to an embodiment of the present disclosure.

FIG. 1 is a block diagram showing a control device which includes a machine learning device according to the embodiment of the present disclosure. Examples of the control target 500 of the control device 10 include a machine tool, a robot and an industrial machine. The control device 10 may be provided as part of the control target such as a machine tool, a robot or an industrial machine.

The control device 10 includes a servo control unit 100, a frequency generation unit 200, a frequency characteristic calculation unit 300 and a machine learning unit 400. The servo control unit 100 corresponds to a servo control device, the frequency characteristic calculation unit 300 corresponds to a frequency characteristic calculation device and the machine learning unit 400 corresponds to a machine learning device. One or a plurality of the frequency generation unit 200, the frequency characteristic calculation unit 300 and the machine learning unit 400 may be provided within the servo control unit 100. The frequency characteristic calculation unit 300 may be provided within the machine learning unit 400.

The servo control unit 100 includes a subtractor 110, a velocity control unit 120, a filter 130, a current control unit 140 and a servo motor 150. The subtractor 110, the velocity control unit 120, the filter 130, the current control unit 140 and the servo motor 150 constitute a velocity feedback loop. As the servo motor 150, a linear motor which performs a linear motion, a motor which includes a rotation axis or the like can be used. The servo motor 150 may be provided as part of the control target 500.

The subtractor 110 determines a difference between a velocity command value which is input and a feedback velocity detection value so as to output the difference as a velocity error to the velocity control unit 120.

The velocity control unit 120 adds a value obtained by multiplying the velocity error by an integral gain K1v and integrating the result and a value obtained by multiplying the velocity error by a proportional gain K2v so as to output the resulting value as a torque command to the filter 130.

The filter 130 is a filter which attenuates a specific frequency component, and for example, a notch filter or a low-pass filter is used. In a machine, such as a machine tool, which is driven with a motor, a resonance point is present, and thus the resonance of the servo control unit 100 may be increased. A filter such as a notch filter is used, and thus it is possible to reduce the resonance. The output of the filter 130 is output as a torque command to the current control unit 140. Mathematical formula 1 (indicated as Math. 1 below) indicates a transfer function F(s) of a notch filter serving as the filter 130. Parameters indicate coefficients $\omega_c$, $\tau$ and k. In mathematical formula 1, the coefficient k is an attenuation coefficient, the coefficient $\omega_c$ is a central angle frequency and the coefficient $\tau$ is a fractional bandwidth. When it is assumed that the central frequency is fc and a bandwidth is fw, the coefficient $\omega_c$ is represented by $\omega_c = 2\pi fc$ and the coefficient $\tau$ is represented by $\tau = fw/fc$.

$$F(s) = \frac{s^2 + 2k\tau\omega_c s + \omega_c^2}{s^2 + 2\tau\omega_c s + \omega_c^2} \quad \text{[Math. 1]}$$

The current control unit 140 generates, based on the torque command, a current command for driving the servo motor 150, and outputs the current command to the servo motor 150. When the servo motor 150 is a linear motor, the position of a movable portion is detected with a linear scale (not shown) provided in the servo motor 150, a position detection value is differentiated so as to determine a velocity detection value and the determined velocity detection value is input as the velocity feedback to the subtractor 110. When the servo motor 150 is a motor which includes a rotation axis, a rotation angle position is detected with a rotary encoder (not shown) provided in the servo motor 150, and a velocity detection value is input as the velocity feedback to the subtractor 110. Although the servo control unit 100 is configured as described above, in order to perform machine learning on optimum parameters for the filter, the control device 10 further includes the frequency generation unit 200, the frequency characteristic calculation unit 300 and the machine learning unit 400.

The frequency generation unit 200 uses, while changing the frequency, a sinusoidal signal as the velocity command so as to output it to the subtractor 110 of the servo control unit 100 and the frequency characteristic calculation unit 300.

Figure 2:
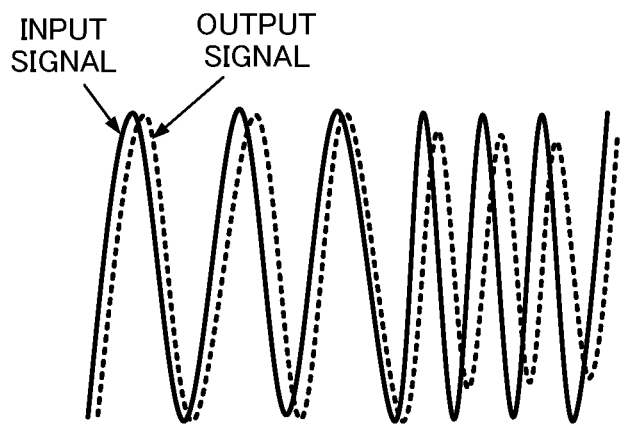
FIG. 2 is a diagram showing a velocity command serving as an input signal and a velocity detection value serving as an output signal.
Figure 3:
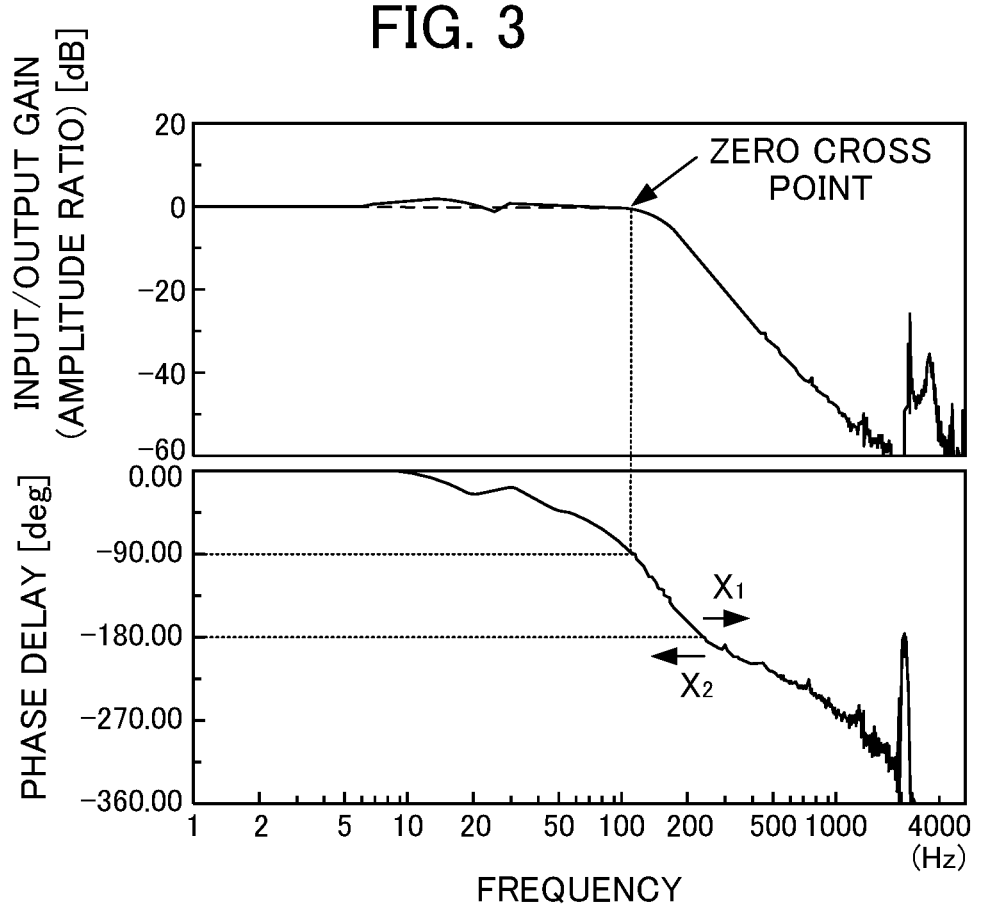
FIG. 3 is a diagram showing an amplitude ratio between an input signal and an output signal and the frequency characteristic of a phase delay.

The frequency characteristic calculation unit 300 uses the velocity command (sinusoidal wave) which is generated in the frequency generation unit 200 and which serves as the input signal and the velocity detection value (sinusoidal wave) which is output from the rotary encoder (not shown) and which serves as the output signal or the integration (sinusoidal wave) of a detection position which serves as the output signal output from the linear scale, and thereby determines, at each frequency specified by the velocity command, an amplitude ratio (input/output gain) between the input signal and the output signal and a phase delay. FIG. 2 is a diagram showing the velocity command serving as the input signal and the velocity detection value serving as the output signal. FIG. 3 is a diagram showing the amplitude ratio between the input signal and the output signal and the frequency characteristic of the phase delay. As shown in FIG. 2, the velocity command output from the frequency generation unit 200 is varied in frequency, and thus the input/output gain (amplitude ratio) and the frequency characteristic of the phase delay as shown in FIG. 3 are obtained.

Figure 4:
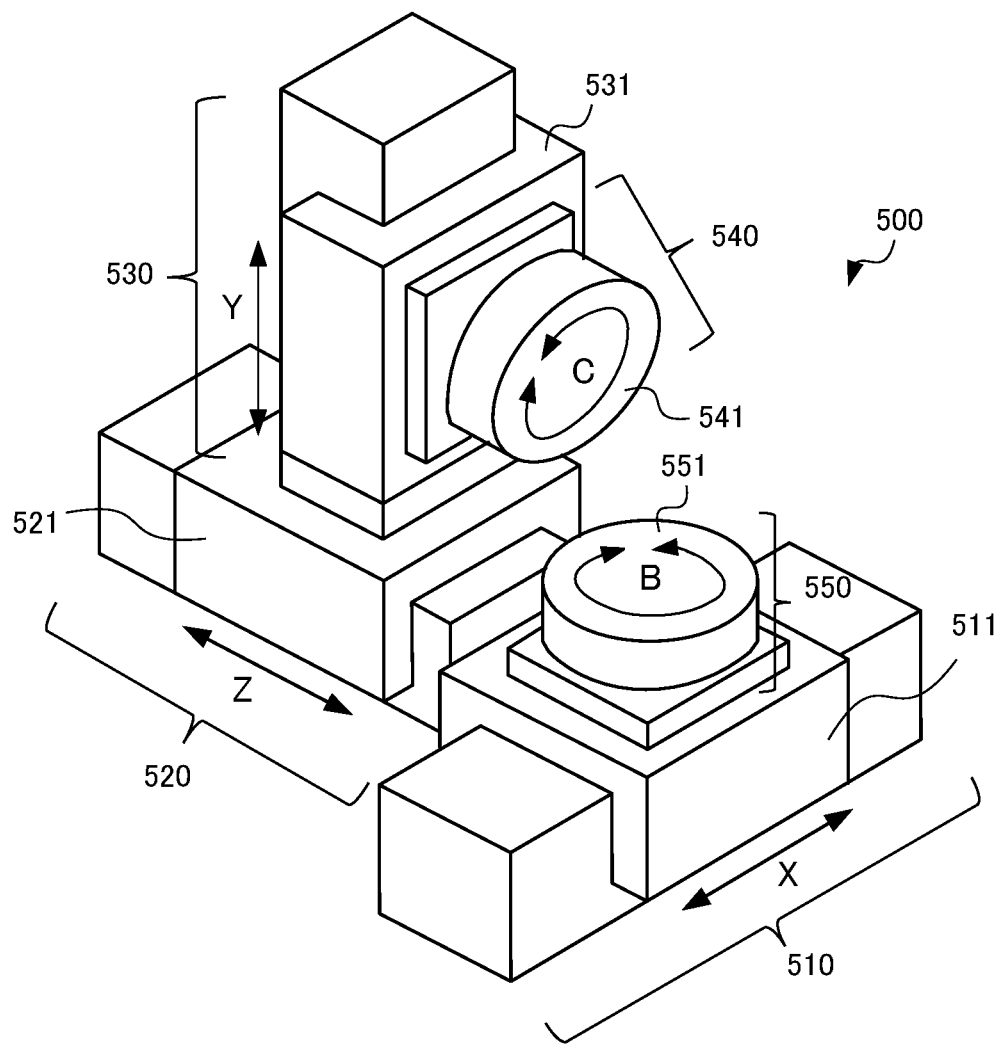
FIG. 4 is a perspective view showing a five-axis machine tool which is an example of the control target of the control device.

The machine learning unit 400 uses the input/output gain (amplitude ratio) output from the frequency characteristic calculation unit 300 and the phase delay so as to perform the machine learning (hereinafter referred to as the learning) on the coefficients $\omega_c$, $\tau$ and k of the transfer function for the filter 130. Although the learning using the machine learning unit 400 is performed before shipment, the learning may be performed again after shipment. The machine tool serving as the control target 500 is, for example, a five-axis machine tool which includes linear three axes of an X axis, a Y axis and a Z axis and rotational two axes of a B axis and a C axis. FIG. 4 is a perspective view showing a five-axis machine tool which is an example of the control target of the control device 10. FIG. 4 shows an example where the servo motor 150 is included in the machine tool serving as the control target 500. The machine tool serving as the control target 500 and shown in FIG. 4 includes linear motors 510, 520 and 530 which linearly move tables 511, 521 and 531 in the direction of the X axis, the direction of the Y axis and the direction of the Z axis, respectively. The linear motor 530 of the Y axis is placed on the linear motor 520 of the Z axis. The machine tool also includes built-in motors 540 and 550 which rotate the tables 541 and 551 in the direction of the C axis and the direction of the B axis, respectively. In the linear motors 510, 520 and 530, tables 511, 521 and 531 are movable portions. In the built-in motors 540 and 550, tables 541 and 551 are movable portions. Hence, the linear motors 510, 520 and 530 and the built-in motors 540 and 550 directly drive the tables 511, 521 and 531 and the tables 541 and 551 without the intervention of a gear and the like. The linear motors 510, 520 and 530 and the built-in motors 540 and 550 each correspond to the servo motor 150. The tables 511, 521 and 531 may connect the rotation axis of the motor to a ball screw through coupling so as to be driven with a nut screwed to the ball screw. The configuration and the detailed operation of the machine learning unit 400 will be further described below. In the following description, as the control target 500, the machine tool shown in FIG. 4 is used as an example.

<Machine Learning Unit 400>

Although in the following discussion, a case where the machine learning unit 400 performs reinforcement learning is described, the learning performed with the machine learning unit 400 is not particularly limited to reinforcement learning, and the present invention can also be applied to, for example, a case where supervised learning is performed.

Before the description of individual function blocks included in the machine learning unit 400, the basic mechanism of the reinforcement learning will first be described. An agent (which corresponds to the machine learning unit 400 in the present embodiment) observes the state of an environment, and selects a certain action, and thus the environment is changed based on the action described above. A certain reward is given according to the change of the environmental, and thus the agent learns selection (decision-making) for a better action. While the supervised learning presents a complete correct answer, the reward in the reinforcement learning is often a fragmental value based on change of part of the environment. Hence, the agent learns to select an action so as to maximize the total rewards over the future.

As described above, in the reinforcement learning, an action is learned, and thus a method of learning a suitable action based on the interaction of the action with the environment, that is, of learning to maximize the reward which can be obtained in the future, is learned. In the present embodiment, this indicates, for example, that it is possible to acquire such an action as to affect the future, that is, an action of selecting action information for reducing vibrations at a machine end.

Here, although an arbitrary learning method can be used as the reinforcement learning, in the following discussion, an example will be given, wherein Q-learning (which is a method of learning a value Q(S,A)) which is selected by an action A under a certain state S of the environment is used. An object of the Q-learning is to select an action A which has the highest value Q(S,A) as an optimum action among actions A which can be taken in a certain state S.

However, at the time when the Q-learning is first started, the correct value of the value Q(S,A) is not found at all for a combination of the state S and the action A. Hence, the agent learns the correct value Q(S,A) by selecting various actions A under a certain state S and selecting a better action based on a reward given for the action A at that time.

Since it is desired to maximize the total rewards obtained over the future, the aim is to to finally achieve Q(S,A)=E[$\Sigma(\gamma^t)r_t$]. Here, E[ ] represents an expected value, t represents time, $\gamma$ presents a parameter called a discount rate which will be described later, $r_t$ represents a reward at the time t and $\Sigma$ represents the sum at the time t. In this formula, the expected value is an expected value when the state is changed according to the optimum action. However, since it is unclear what action is the optimum action in the process of the Q-learning, the reinforcement learning is performed while a search is being conducted by performing various actions. A formula for updating the value Q(S,A) as described above can be represented by, for example, mathematical formula 2 below (indicated as Math. 2 below).

$$Q(S_{t+1}, A_{t+1}) \leftarrow \quad \text{[Math. 2]}$$

$$Q(S_t, A_t) + \alpha\left(r_{t+1} + \gamma \max_A Q(S_{t+1}, A) - Q(S_t, A_t)\right)$$

In mathematical formula 2 described above, $S_t$ represents the state of an environment at the time t and $A_t$ represents an action at the time t. By the action $A_t$, the state is changed to $S_{t+1}$. Here, $r_{t+1}$ represents a reward obtained by the change of the state. A term with max is obtained by multiplying, by $\gamma$, a Q value when an action A which has the highest Q value found at that time is selected under the state $S_{t+1}$. Here, $\gamma$ is a parameter of $0<\gamma\leq 1$ and is called a discount rate. Moreover, $\alpha$ is a learning coefficient and is assumed to be in a range of $0<\alpha\leq 1$.

Mathematical formula 2 described above represents a method of updating a value $Q(S_t,A_t)$ of an action $A_t$ in a state $S_t$ based on a reward $r_{t+1}$ which is returned as a result of the action $A_t$. This updating formula indicates that when the value $\max_a Q(S_{t+1},A)$ of the best action in the subsequent state $S_{t+1}$ caused by the action $A_t$ is higher than the value $Q(S_t,A_t)$ of the action $A_t$ in the state $S_t$, $Q(S_t,A_t)$ is increased whereas when the value $\max_a Q(S_{t+1},A)$ is lower than the value $Q(S_t,A_t)$, $Q(S_t,A_t)$ is decreased. In other words, the value of a certain action in a certain state is made to approach the value of the best action in the subsequent state caused by it. However, although this difference is changed depending on the discount rate $\gamma$ and the reward $r_{t+1}$, the value of the best action in a certain state basically propagates to the value of an action in a state preceding the best action.

Here, in the Q-learning, there is a method of producing a table of the Q(S,A) for all state-action pairs (S,A) so as to perform the learning. However, it is likely that since the number of states is too large to determine the values of the Q(S,A) in all the state-action pairs, it takes a long time for the Q-learning to converge.

Hence, a known technology called a DQN (Deep Q-Network) may be utilized. Specifically, the value of the value Q(S,A) may be calculated by forming a value function Q with an appropriate neural network, adjusting the parameters of the neural network and thereby approximating the value function Q with the appropriate neural network. By utilization of the DQN, it is possible to shorten the time necessary for the convergence of the Q-learning. The details of the DQN are disclosed in, for example, a Non-Patent Document below.

<Non-Patent Document>

"Human-level control through deep reinforcement learning", written by Volodymyr Mnihl, [online], [searched on Jan. 17, 2017], Internet <URL: http://files.davidqiu.com/research/nature14236.pdf>

The machine learning unit 400 performs the Q-learning described above. Specifically, the machine learning unit 400 learns the value Q in which the values of the coefficients $\omega_c$, $\tau$ and k of the transfer function for the filter 130, the input/output gain (amplitude ratio) output from the frequency characteristic calculation unit 300 and the phase delay are set to the state S, and in which the adjustment of the values of the coefficients $\omega_c$, $\tau$ and k of the transfer function for the filter 130 related to the state S is selected as the action A.

The machine learning unit 400 drives the servo control unit 100 based on the coefficients $\omega_c$, $\tau$ and k of the transfer function for the filter 130 with the above-described velocity command that is the sinusoidal wave whose frequency is changed, and thereby observes state information S which is obtained from the frequency characteristic calculation unit 300 and which includes the input/output gain (amplitude ratio) and the phase delay at each frequency so as to determine the action A. The machine learning unit 400 receives a reward each time the action A is performed. For example, the machine learning unit 400 searches, in a trial-and-error manner, for the optimum action A such that the total rewards over the future are maximized. By doing so, the machine learning unit 400 drives, based on the coefficients $\omega_c$, $\tau$ and k of the transfer function for the filter 130, the servo control unit 100 with the velocity command that is the sinusoidal wave whose frequency is changed, and thereby can select the optimum action A (that is, the optimum coefficients $\omega_c$, $\tau$ and k of the transfer function for the filter 130) for the state S which is obtained from the frequency characteristic calculation unit 300 and which includes the input/output gain (amplitude ratio) and the phase delay at each frequency.

In other words, based on the value function Q learned by the machine learning unit 400, among the actions A applied to the coefficients $\omega_c$, $\tau$ and k of the transfer function for the filter 130 related to a certain state S, such an action A as to maximize the value of Q is selected, and thus it is possible to select such an action A (that is, the coefficients $\omega_c$, $\tau$ and k of the transfer function for the filter 130) as to minimize vibrations at the machine end caused by executing a program for generating a sinusoidal signal whose frequency is varied.

The state S includes the values of the coefficients $\omega_c$, $\tau$ and k of the transfer function for the filter 130, the input/output gain (amplitude ratio) and phase delay output from the frequency characteristic calculation unit 300 by driving the servo control unit under each of a plurality of conditions, and the plurality of conditions. The machine learning unit 400 determines, based on the input/output gain (amplitude ratio) and the phase delay which are included in the state S under each of the conditions, an evaluation value under each of the conditions, and adds the evaluation values under the individual conditions so as to determine the reward. The details of a method of determining the reward will be described later. The action A is the modified information of the coefficients $\omega_c$, $\tau$ and k of the transfer function for the filter 130.

As a plurality of conditions, for example, three examples below can be mentioned.

(a) A plurality of positions of an axis (for example, the X axis) controlled by the servo control unit 100

The positions are a plurality of positions which are changed by the servo control unit 100, for example, a plurality of positions of the axis which are specified with a predetermined pitch such as 200 mm. The positions may be a plurality of positions, determined as the left end, the center and the right end of the axis. The positions may be four or more points. Here, in the case of the machine tool, the position of the axis corresponds to, for example, the position of the table. When the servo motor 150 is a linear motor, the position of the X axis controlled by the servo control unit 100 is determined by the detection position of the movable portion (table) of the linear motor detected with the linear scale. The detection position of the movable portion is input from the linear scale to the machine learning unit 400. When the servo motor 150 is a motor which includes a rotation axis, for example, the rotation axis of the motor is connected through coupling to a ball screw, and thus a nut screwed to the ball screw drives the table. Hence, the position of the axis controlled by the servo control unit 100 is determined by detecting the movement of the table with the linear scale attached to the table and using the detection position thereof. The detection position (the position of the axis) of the table is input to the machine learning unit 400 as the state S. FIG. 1 shows how the detection position (the position of the axis) of the table which serves as part of the control target 500 and which is attached to the table is input to the machine learning unit 400. The state S includes the values of the coefficients $\omega_c$, $\tau$ and k of the transfer function for the filter 130, the input/output gain (amplitude ratio) and phase delay for each condition output from the frequency characteristic calculation unit 300 by driving the servo control unit under each of a plurality of conditions (a plurality of positions of the X axis), and the detection position (the position of the axis) of the table corresponding to each of the conditions.

Figure 5:
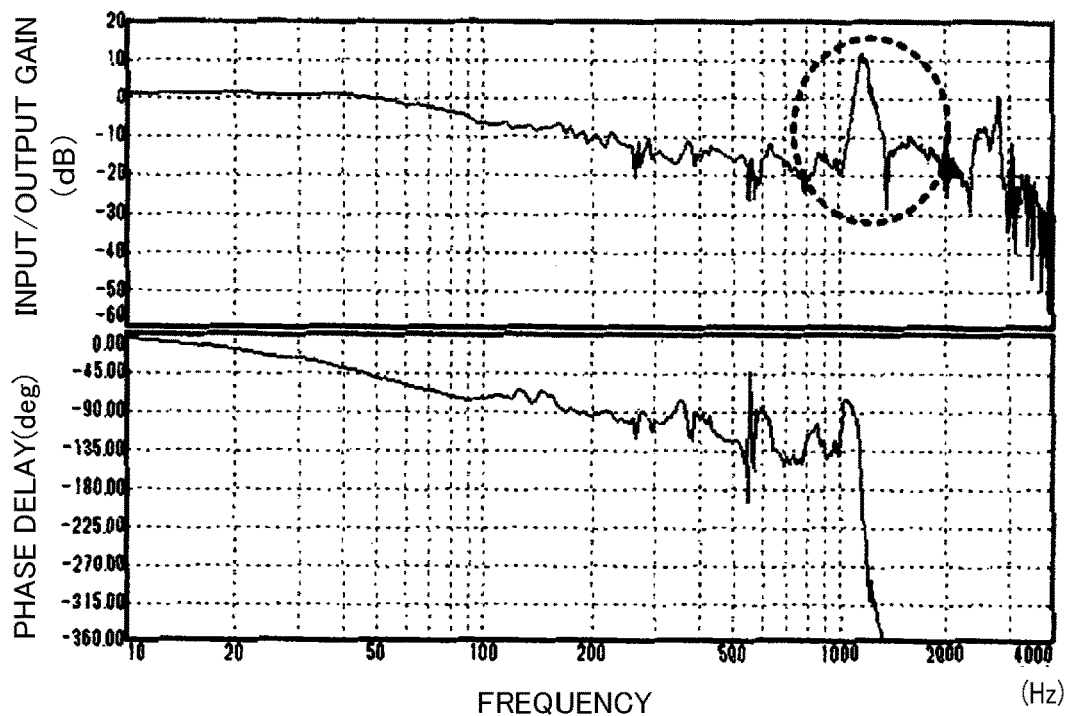
FIG. 5 is a characteristic diagram showing an example of the frequency characteristic of an X axis at a left end of the X axis.
Figure 6:
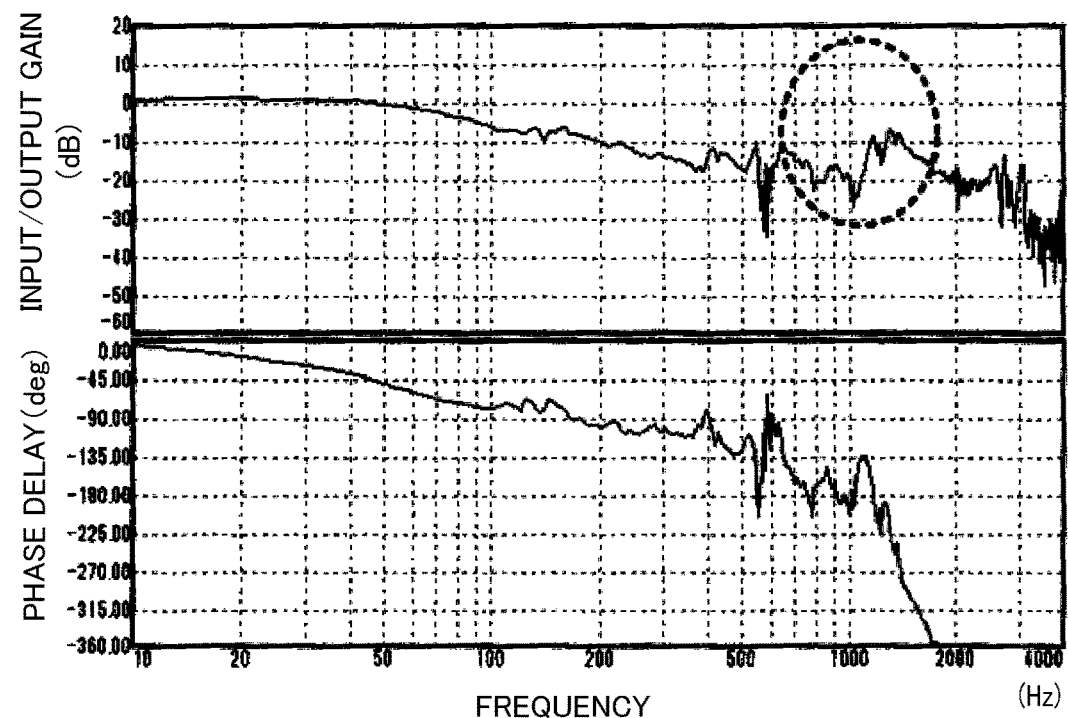
FIG. 6 is a characteristic diagram showing an example of the frequency characteristic of the X axis at the center of the X axis.
Figure 7:
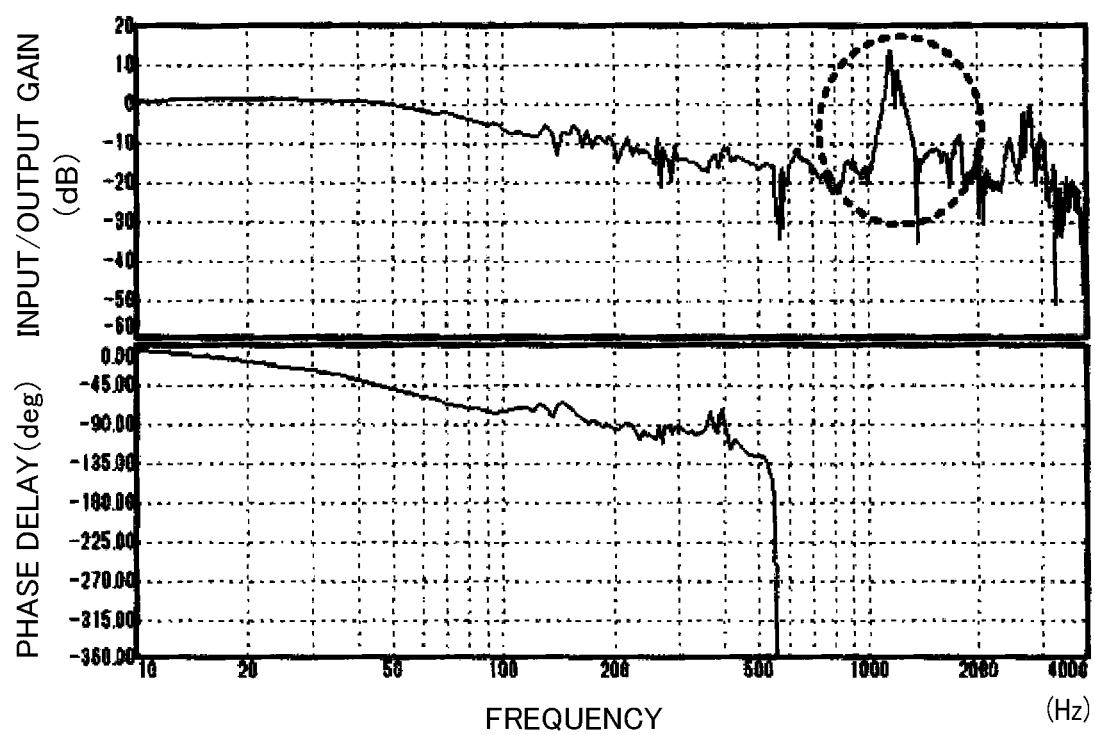
FIG. 7 is a characteristic diagram showing an example of the frequency characteristic of the X axis at a right end of the X axis.

FIGS. 5 to 7 are characteristic diagrams showing an example of the frequency characteristic (frequency characteristic of the input/output gain and the phase delay) of the X axis at the left end, the center and the right end of the X axis. As indicated in a region of the frequency characteristic of the input/output gain in FIGS. 5 and 7 surrounded by a dotted line, resonance is increased at the left end and the right end of the X axis, and as indicated in a region of the frequency characteristic of the input/output gain in FIG. 6 surrounded by a dotted line, resonance is decreased at the center of the X axis. The machine learning unit 400 determines, based on the input/output gain (amplitude ratio) and the phase delay in a plurality of positions (for example, the left end, the center and the right end of the X axis) of the X axis which are included in the state S and which correspond to each of the conditions, the evaluation value under each of the conditions, and sums the evaluation values so as to determine the reward.

(b) A plurality of velocity gains of the servo control unit which controls an axis (for example, the Z axis) different from an axis (for example, the Y axis) controlled by the servo control unit 100

Figure 8:
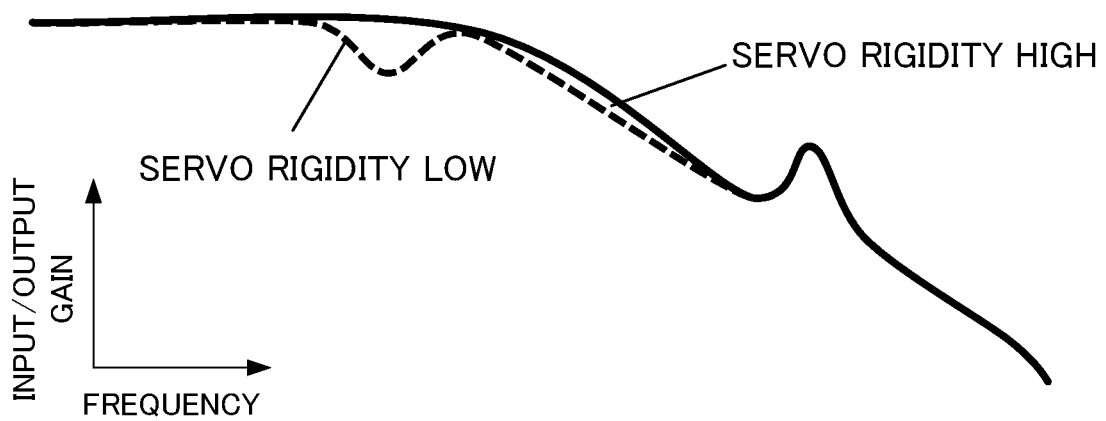
FIG. 8 is a schematic characteristic diagram showing how, with the servo rigidity of one axis, the frequency characteristic of the input/output gain of the other axis is changed.

FIG. 8 is a schematic characteristic diagram showing how, with the servo rigidity of one axis, the frequency characteristic of the input/output gain of the other axis is changed. Here, the servo rigidity indicates strength for disturbance, and FIG. 8 shows that as the servo rigidity is lowered, the change of the frequency characteristic of the input/output gain of the other axis with the servo rigidity of the one axis is increased. When the velocity gain of the servo control unit which controls the Z axis is decreased, the servo rigidity of the Y axis is lowered whereas when the velocity gain of the servo control unit which controls the Z axis is increased, the servo rigidity of the Y axis is increased. Hence, a plurality of velocity gains are set with consideration given to the characteristic of the servo rigidity shown in FIG. 8. Although here, the frequency characteristic of the Y axis when the velocity gains of the servo control unit which controls the Z axis are different is described, three or more velocity gains of the servo control unit which controls the Z axis may be set.

The velocity gains of the servo control unit which controls the Z axis are input as the state S to the machine learning unit 400 which optimizes the coefficients for the filter of the servo control unit 100 of the Y axis. The state S includes the values of the coefficients $\omega_c$, $\tau$ and k of the transfer function for the filter 130, the input/output gain (amplitude ratio) and the phase delay which are output from the frequency characteristic calculation unit 300 by driving the servo control unit under each of a plurality of conditions (a plurality of velocity gains) and which are based on each of the conditions and the velocity gain of the servo control unit which corresponds to each of the conditions and which controls the Z axis. The machine learning unit 400 determines, based on the input/output gain (amplitude ratio) and the phase delay of the Y axis in the velocity gain of the servo control unit that controls the Z axis which are included in the state S and which correspond to each of the conditions, an evaluation value under each of the conditions, and sums the evaluation values so as to determine the reward.

(c) A plurality of positions of an axis (for example, the Y axis) different from an axis (for example, the Z axis) controlled by the servo control unit 100

The frequency characteristic of one axis controlled by the servo control unit 100 may be changed by the position of another axis. As an example thereof, there is a case where as shown in FIG. 4, the Y axis is placed on the Z axis and where the frequency characteristic of the Z axis is changed depending on a plurality of positions of the Y axis. The positions are changed by the servo control unit (not shown) of the Y axis, and are, for example, a plurality of positions on the axis specified with a predetermined pitch such as 200 mm. The positions may be a plurality of positions, such as the upper end and the lower end of the Y axis, which are determined. The positions may be three or more points. When the servo motor 150 is a linear motor, the position of the Y axis controlled by the servo control unit is determined by the detection position of the movable portion of the linear motor detected with the linear scale. The detection position of the movable portion is input from the linear scale to the machine learning unit 400 which optimizes the coefficients for the filter of the servo control unit 100 of the Z axis.

Figure 9:
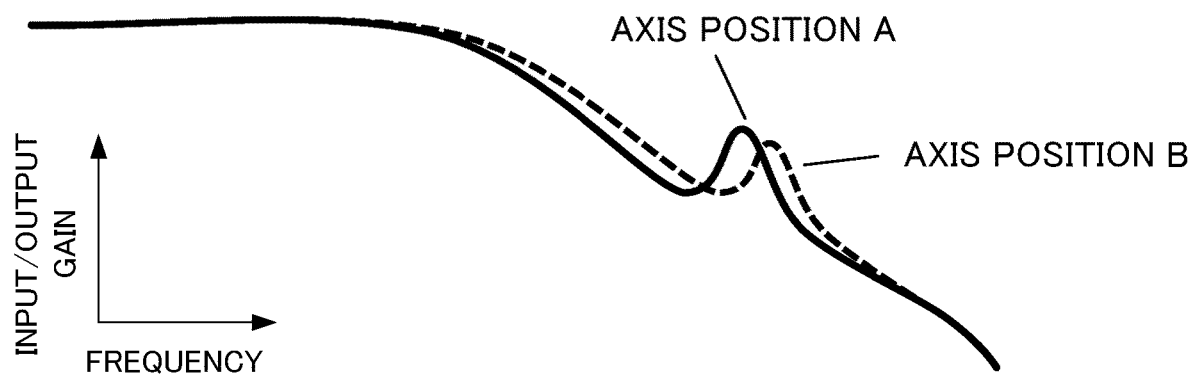
FIG. 9 is a schematic characteristic diagram showing how, with the position of one axis, the frequency characteristic of the input/output gain of the other axis is changed.

When the servo motor 150 is a motor which includes a rotation axis, for example, the rotation axis of the motor is connected through coupling to a ball screw, and thus a nut screwed to the ball screw drives the table of the control target. Hence, the position of the Y axis controlled by the servo control unit is determined by detecting the movement of the table with the linear scale attached to the table and using the detection position thereof. The detection position of the table is input as the state S to the machine learning unit 400 which optimizes the coefficients for the filter of the servo control unit of the Z axis. FIG. 9 is a schematic characteristic diagram showing how, with the position of one axis, the frequency characteristic of the input/output gain of the other axis is changed. FIG. 9 shows how the position and the size of a rise of the input/output gain of the other axis are changed with the position (the axis position A and the axis position B of FIG. 9) of the one axis.

The state S includes the values of the coefficients $\omega_c$, $\tau$ and k of the transfer function for the filter 130, the input/output gain (amplitude ratio) and phase delay for each condition output from the frequency characteristic calculation unit 300 by driving the servo control unit under each of a plurality of conditions (a plurality of positions of the Y axis) and the detection position (the position of the axis) of the table of the Y axis corresponding to each of the conditions. The machine learning unit 400 determines, based on the input/output gain (amplitude ratio) and phase delay of the Z axis in the positions (for example, the upper end and the lower end of the Y axis) of the Y axis which are included in the state S, an evaluation value corresponding to each of the conditions in each of the positions of the Y axis and sets the sum of the evaluation values to the reward. The machine learning unit 400 determines, based on the input/output gain (amplitude ratio) and phase delay under each of a plurality of conditions (for example, the upper end and the lower end of the Y axis) of the frequency characteristic of the Z axis in the positions (for example, the upper end and the lower end of the Y axis) of the Y axis which are included in the state S, the evaluation value under each of the conditions, and sums the evaluation values so as to determine the reward.

Although in (b) discussed above, the case where the frequency characteristic of the Y axis is changed by the velocity gain of the servo control unit which controls the Z axis is described, the frequency characteristic of the Z axis below the Y axis may be changed by the velocity gain of the servo control unit which controls the Y axis. Although in (c) discussed above, the case where the frequency characteristic of the Z axis controlled by the servo control unit 100 is changed by the position of the Y axis is described, the frequency characteristic of the Y axis controlled by the servo control unit 100 may be changed by the position of the Y axis.

By use of the reward which is the sum of the individual evaluation values under a plurality of conditions in any one of (a) to (c) illustrated as described above, the machine learning unit 400 performs the learning, and thus even in a machine in which the frequency characteristic (the frequency characteristic of the input/output gain and the phase delay) is changed by a plurality of conditions, it is possible to adjust the optimum coefficients $\omega_c$, $\tau$ and k of the transfer function for the filter 130.

When the calculated input/output gain is equal to or less than the input/output gain of a standard model, the evaluation value is a positive value which is given when the phase delay is decreased, a negative value which is given when the phase delay is increased or a zero value which is given when the phase delay is not changed. The standard model is a model of the servo control unit which has an ideal characteristic without any oscillation. The input/output gain of the standard model will be described later. Even when the reward is determined by the sum of the individual evaluation values under a plurality of conditions, and thus the frequency characteristic of the input/output gain or the phase delay under each of the conditions is changed, it is possible to efficiently perform learning in which the adjustment of the filter is stably performed.

A weight may be assigned to the evaluation value corresponding to each of a plurality of conditions. A weight is assigned to the evaluation value as described above, and thus even when influences exerted by the individual conditions on a machine characteristic differ from each other, the reward corresponding to the influence can be set. For example, in (a) described above, the evaluation values determined in the positions of the left end, the center and the right end of the X axis are assumed to be Es(L), Es(C) and Es(R), and the reward is assumed to be Re. The weighting coefficients of the evaluation values Es(L), Es(C) and Es(R) are assumed to be coefficients a, b and c, and the reward Re is determined by Re=a×Es(L)+b×Es(C)+c×Es(R). The coefficients a, b and c may be determined as necessary, and for example, in the case of the machine tool in which oscillation is unlikely to occur in the center of the X axis, the coefficient b may be set lower than the coefficients a and c.

When the reward is determined by the sum of the individual evaluation values corresponding to the individual conditions, even if one evaluation value is a negative value, the other evaluation values may be positive values such that the reward is a positive value. Hence, only when all the evaluation values are zero or positive values, the reward may be determined by the sum of the individual evaluation values corresponding to the individual conditions. Then, when even one negative value is present among all the evaluation values, the reward is set to a negative value. Preferably, this negative value is set to a large value (for example, $-\infty$), and thus a case where even one negative value is present among all the evaluation values is prevented from being selected. In this way, it is possible to efficiently perform learning in which the adjustment of the filter is stably performed in any position.

Figure 10:
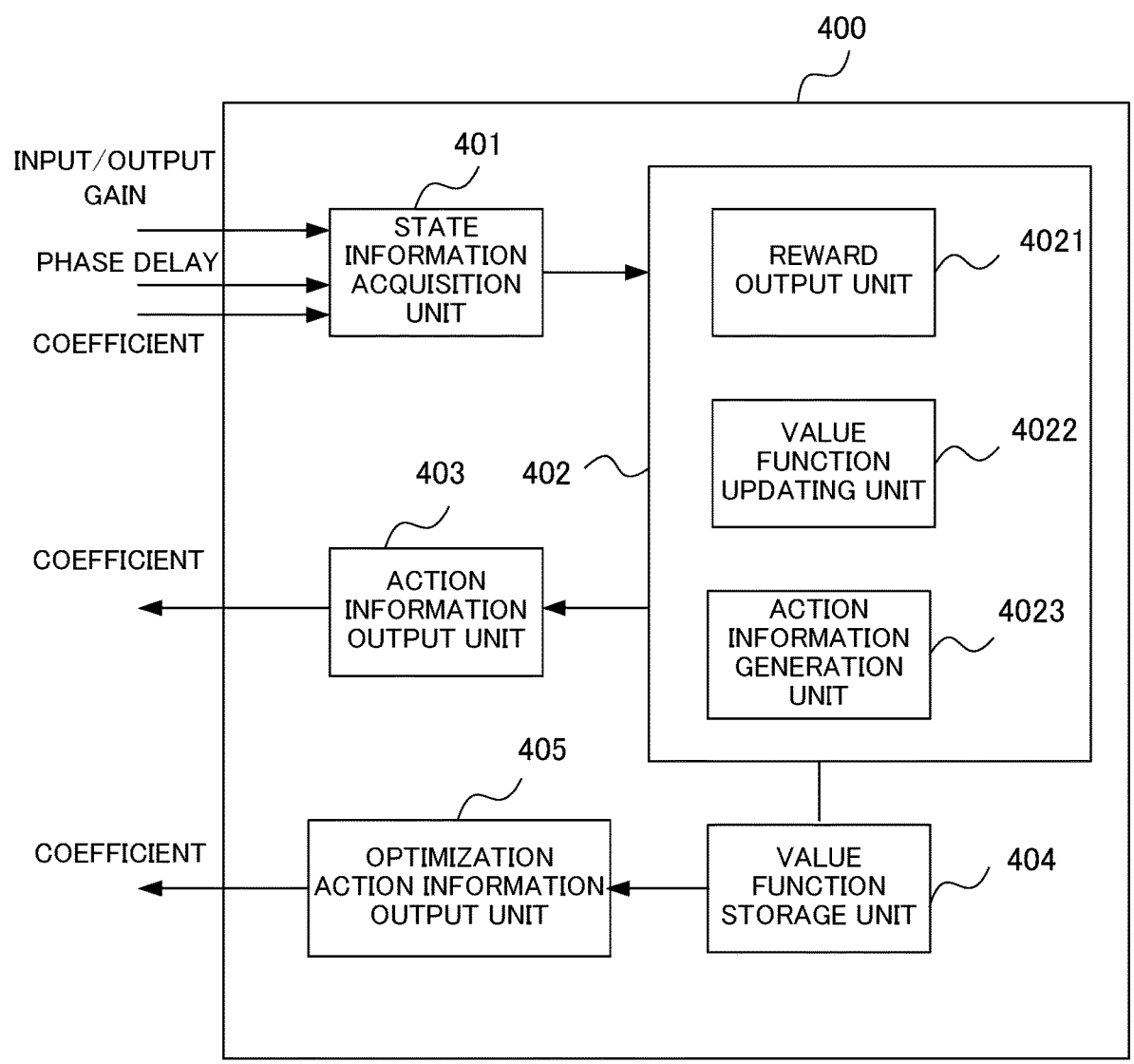
FIG. 10 is a block diagram showing a machine learning unit according to the embodiment of the present disclosure.

FIG. 10 is a block diagram showing the machine learning unit 400 according to the embodiment of the present disclosure. In order to perform the reinforcement learning described previously, as shown in FIG. 10, the machine learning unit 400 includes a state information acquisition unit 401, a learning unit 402, an action information output unit 403, a value function storage unit 404 and an optimization action information output unit 405. The learning unit 402 includes a reward output unit 4021, a value function updating unit 4022 and an action information generation unit 4023.

The state information acquisition unit 401 acquires, from the frequency characteristic calculation unit 300, based on the coefficients $\omega_c$, $\tau$ and k of the transfer function for the filter 130, the state S which includes the input/output gain (amplitude ratio) and phase delay under each of the conditions obtained by driving the servo control unit 100 with the velocity command (sinusoidal wave). This state information S corresponds to an environment state S in the Q-learning. The state information acquisition unit 401 outputs the acquired state information S to the learning unit 402.

The coefficients $\omega_c$, $\tau$ and k of the transfer function for the filter 130 at the time when the Q-learning is first started are previously generated by a user. In the present embodiment the initial setting values of the coefficients $\omega_c$, $\tau$ and k of the transfer function for the filter 130 which are produced by the user are adjusted to be optimum by means of reinforcement learning. When an operator adjusts the machine tool beforehand, the adjusted values of the coefficients $\omega_c$, $\tau$ and k may be set to the initial values and machine learning may be performed.

The learning unit 402 is a unit which learns, under a certain environment state S, the value Q(S,A) when a certain action A is selected.

The reward output unit 4021 is a unit which calculates, under the certain state S, the reward when the action A is selected. When the coefficients $\omega_c$, $\tau$ and k of the transfer function for the filter 130 are modified, the reward output unit 4021 compares an input/output gain Gs calculated under each of the conditions with an input/output gain Gb at each frequency of the preset standard model. When the calculated input/output gain Gs is greater than the input/output gain Gb of the standard model, the reward output unit 4021 provides a first negative evaluation value. On the other hand, when the calculated input/output gain Gs is equal to or less than the input/output gain Gb of the standard model, the reward output unit 4021 provides a positive evaluation value if the phase delay is decreased, provides a second negative evaluation value if the phase delay is increased or provides a zero evaluation value if the phase delay is not changed. Preferably, the absolute value of the second negative value is set lower than the absolute value of the first negative value, and thus a case where the calculated input/output gain Gs is greater than the input/output gain Gb of the standard model is prevented from being selected.

Figure 11:
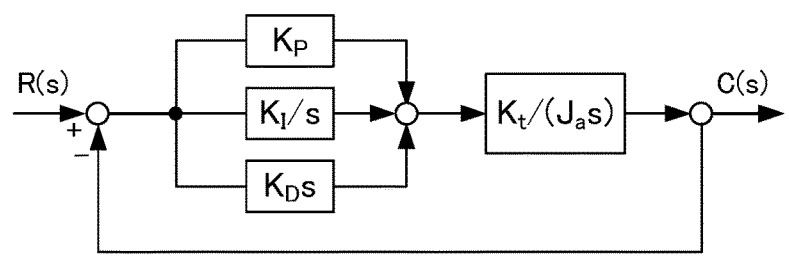
FIG. 11 is a block diagram serving as a model for calculating the standard model of the input/output gain.
Figure 12:
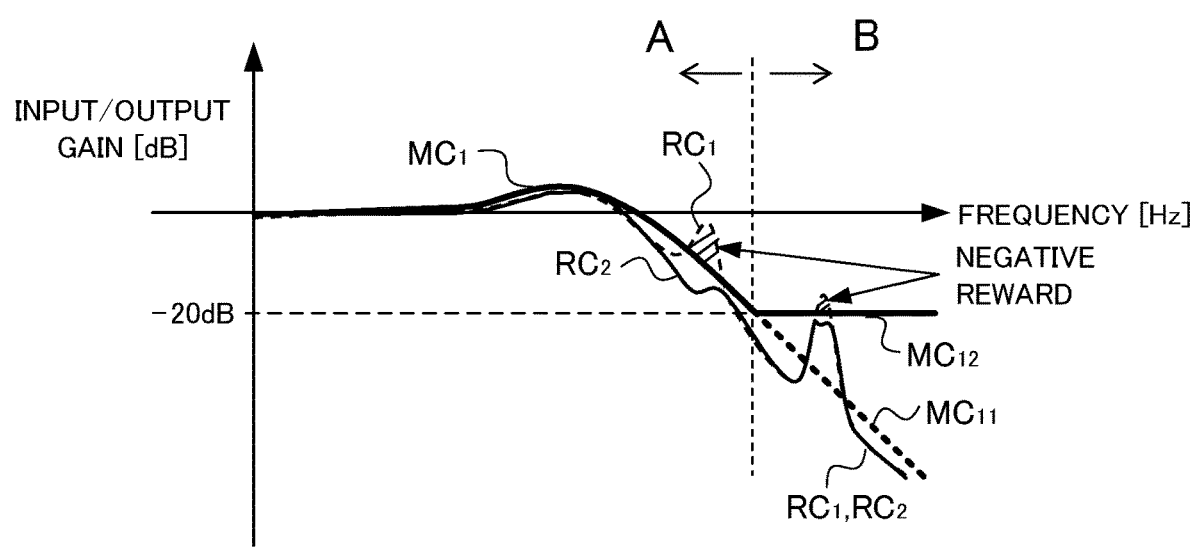
FIG. 12 is a characteristic diagram showing the frequency characteristic of the input/output gains of a servo control unit in the standard model and a servo control unit before and after learning.

An operation of providing the negative evaluation value with the reward output unit 4021 when the calculated input/output gain Gs is greater than the input/output gain Gb of the standard model will first be described with reference to FIGS. 11 and 12. The reward output unit 4021 stores the standard model of the input/output gain. The standard model is a model of the servo control unit which has an ideal characteristic without any oscillation. The standard model can be determined by calculation from, for example, inertia Ja, a torque constant $K_t$, a proportional gain $K_p$, an integral gain $K_I$ and a derivative gain $K_D$ shown in FIG. 11. The inertia Ja is a value obtained by adding motor inertia and machine inertia. FIG. 12 is a characteristic diagram showing the frequency characteristic of the input/output gains of the servo control unit in the standard model and the servo control unit 100 before and after the learning. As shown in the characteristic diagram of FIG. 12, the standard model includes a region A which is a frequency region where an ideal input/output gain equal or greater than a constant input/output gain, for example, equal or greater than −20 db, is provided and a region B which is a frequency region where an input/output gain less than the constant input/output gain is provided. In the region A of FIG. 12, the ideal input/output gain in the standard model is indicated by a curve $MC_1$ (thick line). In the region B of FIG. 12, an ideal virtual input/output gain in the standard model is indicated by a curve $MC_{11}$ (a thick broken line), and the input/output gain in the standard model is set to a constant value and is indicated by a straight line $MC_{12}$ (a thick line). In the regions A and B of FIG. 12, the curves of the input/output gains of the servo control unit before and after the learning are indicated by curves $RC_1$ and $RC_2$, respectively.

In the region A, when the curve $RC_1$ before the learning of the calculated input/output gain exceeds the curve $MC_1$ of the ideal input/output gain in the standard model, the reward output unit 4021 provides the first negative evaluation value. In the region B where the frequency at which the input/output gain is sufficiently decreased is exceeded, even when the curve $RC_1$ of the input/output gain before the learning exceeds the curve $MC_{11}$ of the ideal virtual input/output gain in the standard model, an influence on stability is decreased. Hence, in the region B, as described above, as the input/output gain in the standard model, not the curve $MC_{11}$ of the ideal gain characteristic but the straight line $MC_{12}$ of the constant input/output gain (for example, −20 dB) is used. However, since instability may be caused when the curve $RC_1$ of the calculated input/output gain before the learning exceeds the straight line $MC_{12}$ of the input/output gain of the constant value, the first negative value is provided as the evaluation value.

An operation in which when the calculated input/output gain Gs is equal to or less than the input/output gain Gb in the standard model, the reward output unit 4021 determines the evaluation value based on the information of the phase delay calculated under each of the conditions so as to determine the reward from the sum of the evaluation values will be described next. In the following description, a phase delay which is a state variable related to the state information S is represented by D(S), and a phase delay which is a state variable related to a state S' changed from the state S by action information A (the modification of the coefficients $\omega_c$, $\tau$ and k of the transfer function for the filter 130) is represented by D(S').

The reward output unit 4021 determines the evaluation value under each of the conditions and determines the sum of the evaluation values under the individual conditions so as to set it to the reward. As a method of determining the evaluation value based on the information of the phase delay with the reward output unit 4021, for example, a method of determining the evaluation value depending on whether the frequency at which the phase delay reaches 180 degrees is increased, is decreased, or is not changed when the state S is changed to the state S' can be applied. Although here, the case where the phase delay is 180 degrees is described, there is no particular limitation to 180 degrees, and another value may be adopted. For example, when the phase delay is indicated by the phase diagram shown in FIG. 3, if the state S is changed to the state S' and the curve is changed such that the frequency at which the phase delay reaches 180 degrees is decreased (in the direction of $X_2$ in FIG. 3), the phase delay is increased. On the other hand, if the state S is changed to the state S' and the curve is changed such that the frequency at which the phase delay reaches 180 degrees is increased (in the direction of $X_1$ in FIG. 3), the phase delay is decreased.

Hence, if the state S is changed to the state S' and the frequency at which the phase delay reaches 180 degrees is decreased, it is defined as phase delay D(S)<phase delay D(S'), and the reward output unit 4021 sets the evaluation value to the second negative value. The absolute value of the second negative value is set lower than the first negative value. On the other hand, if the state S is changed to the state S' and the frequency at which the phase delay reaches 180 degrees is increased, it is defined as phase delay D(S)>phase delay D(S'), and the reward output unit 4021 sets the evaluation value to a positive value. If the state S is changed to the state S' and the frequency at which the phase delay reaches 180 degrees is not changed, it is defined as phase delay D(S)=phase delay D(S'), and the reward output unit 4021 sets the evaluation value to the zero value. The method of determining the evaluation value based on the information of the phase delay is not limited to the method described above, and another method can be applied.

With respect to a negative value when it is defined that the phase delay D(S') in the state S' after the action A is performed is greater than the phase delay D(S) in the previous state S, the negative value may be increased according to a ratio. For example, in the first method described above, the negative value is preferably increased according to the degree to which the frequency is decreased. By contrast, with respect to a positive value when it is defined that the phase delay D(S') in the state S' after the action A is performed is lower than the phase delay D(S) in the previous state S, the positive value may be increased according to a ratio. For example, in the first method described above, the positive value is preferably increased according to the degree to which the frequency is increased.

The reward output unit 4021 determines the evaluation value under each of the conditions. Then, the reward output unit 4021 adds the evaluation values under the individual conditions so as to determine the reward. This reward is the sum of the evaluation values under the individual conditions of the machine tool. As already described, when the curve $RC_1$ before the learning of the calculated input/output gain exceeds the curve $MC_1$ of the ideal input/output gain in the standard model, the reward output unit 4021 provides the first negative evaluation value. Since when the curve $RC_1$ before the learning of the calculated input/output gain exceeds the curve $MC_1$ of the ideal input/output gain in the standard model, the reward output unit 4021 does not determine the evaluation value based on the phase delay, the evaluation value is the first negative evaluation value when the curve $RC_1$ before the learning of the calculated input/output gain exceeds the curve $MC_1$ of the ideal input/output gain in the standard model.

The value function updating unit 4022 performs the Q-learning based on the state S, the action A, the state S' when the action A is applied to the state S and the reward calculated as described above so as to update the value function Q stored in the value function storage unit 404. The updating of the value function Q may be performed by on-line learning, may be performed by batch learning or may be performed by mini-batch learning. The on-line learning is a learning method in which each time a certain action A is applied to the current state S such that the state S is changed to the new state S', the value function Q is immediately updated. Batch learning is a learning method in which the application of a certain action A to the current state S such that the state S is changed to the new state S' is repeated, in which thus learning data is collected and in which all the learning data collected is used to update the value function Q. Furthermore, mini-batch learning is a learning method which is midway between the on-line learning and batch learning and in which each time a certain amount of learning data is stored, the value function Q is updated.

The action information generation unit 4023 selects the action A in the process of the Q-learning for the current state S. In order for an operation (which corresponds to the action A in the Q-learning) of modifying the coefficients $\omega_c$, $\tau$ and k of the transfer function for the filter 130 to be performed in the process of the Q-learning, the action information generation unit 4023 generates the action information A and outputs the generated action information A to the action information output unit 403. More specifically, for example, the action information generation unit 4023 may incrementally add or subtract the coefficients $\omega_c$, $\tau$ and k of the transfer function for the filter 130 included in the action A to or from the coefficients $\omega_c$, $\tau$ and k of the transfer function for the filter 130 included in the state S.

Figure 13:
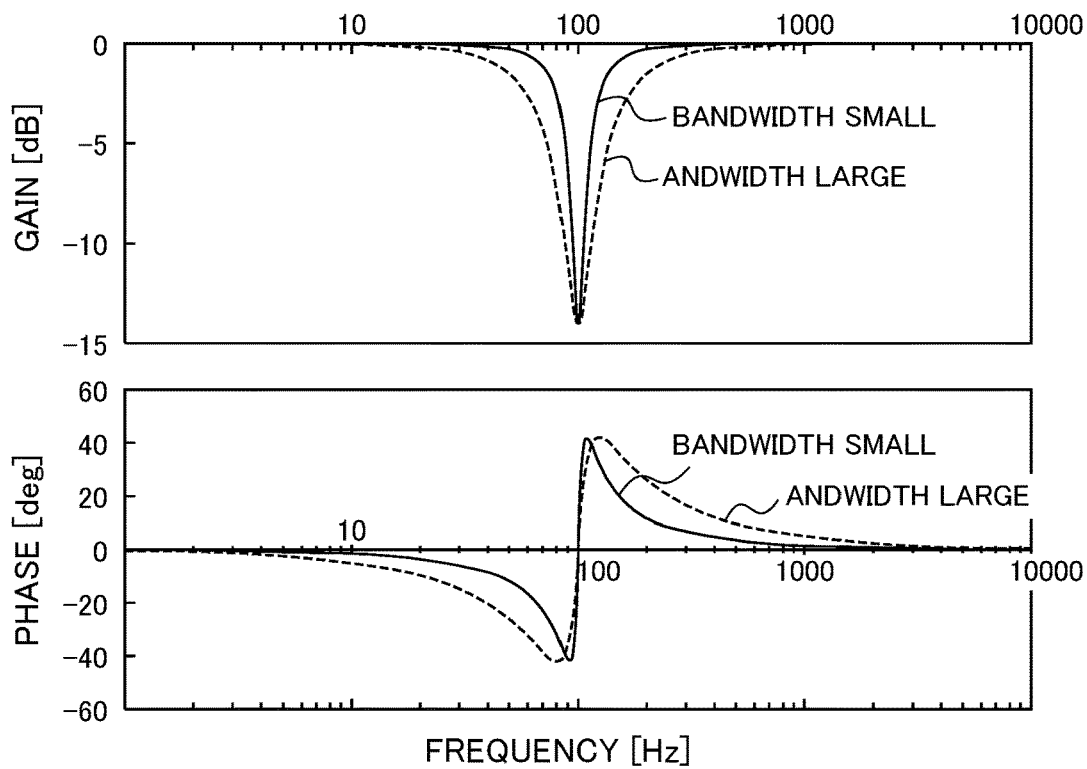
FIG. 13 is a characteristic diagram showing a relationship between the bandwidth of a filter and a gain and a phase.
Figure 14:
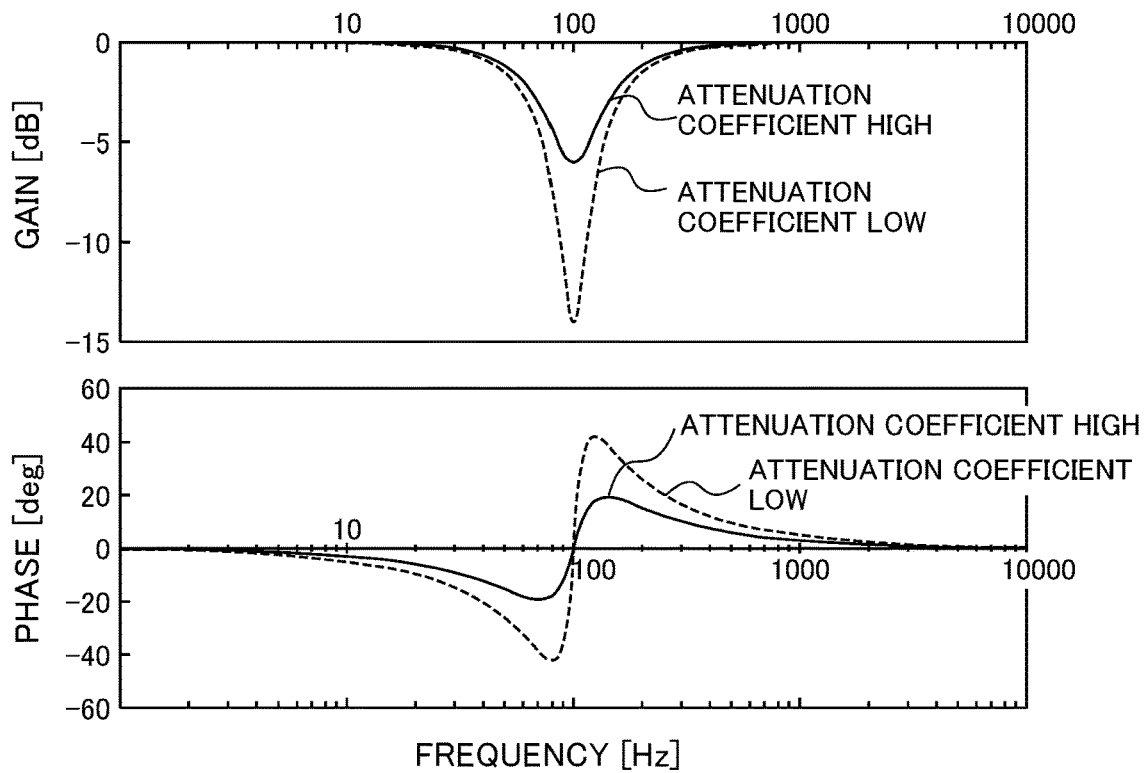
FIG. 14 is a characteristic diagram showing a relationship between the attenuation coefficient of the filter and the gain and the phase.

Although all the coefficients $\omega_c$, $\tau$ and k may be modified, part of the coefficients may be modified. The center frequency fc at which oscillation occurs is easily found, and thus the center frequency fc is easily identified. Hence, in order for an operation of temporarily fixing the center frequency fc, modifying the bandwidth fw and the attenuation coefficient k, that is, fixing the coefficient $\omega_c$ (=2πfc) and modifying the coefficient $\tau$ (=fw/fc) and the attenuation coefficient k to be performed, the action information generation unit 4023 may generate the action information A and output the generated action information A to the action information output unit 403. In the characteristic of the filter 130, as shown in FIG. 13, the gain and the phase are changed by the bandwidth fw of the filter 130. In FIG. 13, a broken line indicates a case where the bandwidth fw is large, and a solid line indicates a case where the bandwidth fw is small. In the characteristic of the filter 130, as shown in FIG. 14, the gain and the phase are changed by the attenuation coefficient k of the filter 130. In FIG. 14, a broken line indicates a case where the attenuation coefficient k is low, and a solid line indicates a case where the attenuation coefficient k is high.

The action information generation unit 4023 may take measures for selecting an action A' by a known method such as a greedy method of selecting the action A' having the highest value Q(S,A) among the values of currently estimated actions A or a E-greedy method of randomly selecting the action A' with a small probability or otherwise selecting the action A' having the highest value Q(S,A).

The action information output unit 403 is a unit which transmits the action information A output from the learning unit 402 to the filter 130. As described above, the filter 130 finely modifies, based on this action information, the current state S, that is, the coefficients $\omega_c$, $\tau$ and k which are currently set so as to change to the subsequent state S' (that is, the modified coefficients of the filter 130).

The value function storage unit 404 is a storage unit which stores the value function Q. The value function Q may be stored as a table (hereinafter referred to as the action value table) for, for example, each state S or each action A. The value function Q stored in the value function storage unit 404 is updated with the value function updating unit 4022. The value function Q stored in the value function storage unit 404 may be shared with another machine learning unit 400. The value function Q is shared between a plurality of machine learning units 400, and thus the reinforcement learning can be performed in the machine learning unit 400 by being distributed, with the result that the efficiency of the reinforcement learning can be enhanced.

The optimization action information output unit 405 generates, based on the value function Q updated by performing the Q-learning with the value function updating unit 4022, the action information A (hereinafter referred to as the "optimization action information") for making the filter 130 perform such an operation as to maximize the value Q(S,A). More specifically, the optimization action information output unit 405 acquires the value function Q stored in the value function storage unit 404. As described above, this value function Q has been updated by performing the Q-learning with the value function updating unit 4022. Then, the optimization action information output unit 405 generates the action information based on the value function Q, and outputs the generated action information to the filter 130. As with the action information output in the process of the Q-learning by the action information output unit 403, the optimization action information includes information for modifying the coefficients $\omega_c$, $\tau$ and k of the transfer function for the filter 130.

In the filter 130, based on this action information, the coefficients $\omega_c$, $\tau$ and k of the transfer function are modified. By the operation described above, the machine learning unit 400 optimizes the coefficients $\omega_c$, $\tau$ and k of the transfer function for the filter 130, and thus the machine learning unit 400 can be operated so as to reduce vibrations at the machine end. Then, the machine learning unit 400 can perform the optimum adjustment of the filter characteristic even when the machine characteristic is changed depending on conditions, for example, even when the machine characteristic is changed depending on the position of one axis or even when the machine characteristic is affected by another axis. As described above, the machine learning unit 400 of the present disclosure is utilized, and thus it is possible to simplify the adjustment of the parameters of the filter 130.

The function blocks included in the control device 10 have been described above. In order to realize these function blocks, the control device 10 includes an operation processing device such as a CPU (Central Processing Unit). The control device 10 also includes an auxiliary storage device such as a HDD (Hard Disk Drive) for storing various control programs such as application software and an OS (Operating System) and a main storage device such as a RAM (Random Access Memory) for storing data temporarily needed when the operation processing device executes programs.

In the control device 10, the operation processing device reads the application software and the OS from the auxiliary storage device, and performs operation processing based on the application software and the OS while developing, in the main storage device, the application software and the OS which are read. The control device 10 also controls various types of hardware provided in individual devices based on the result of the operation. In this way, the function blocks of the present embodiment are realized. In other words, the present embodiment can be realized by cooperation of hardware and software.

Preferably, since the machine learning unit 400 involves a large amount of operation associated with the machine learning, for example, GPUs (Graphics Processing Units) are incorporated in a personal computer and are utilized for operation processing associated with the machine learning by a technology called GPGPUs (General-Purpose computing on Graphics Processing Units), and thus high-speed processing can be performed. Furthermore, in order to perform higher speed processing, a computer cluster may be constructed with a plurality of computers equipped with such GPUs, and the computers included in the computer cluster may perform parallel processing.

Figure 15:
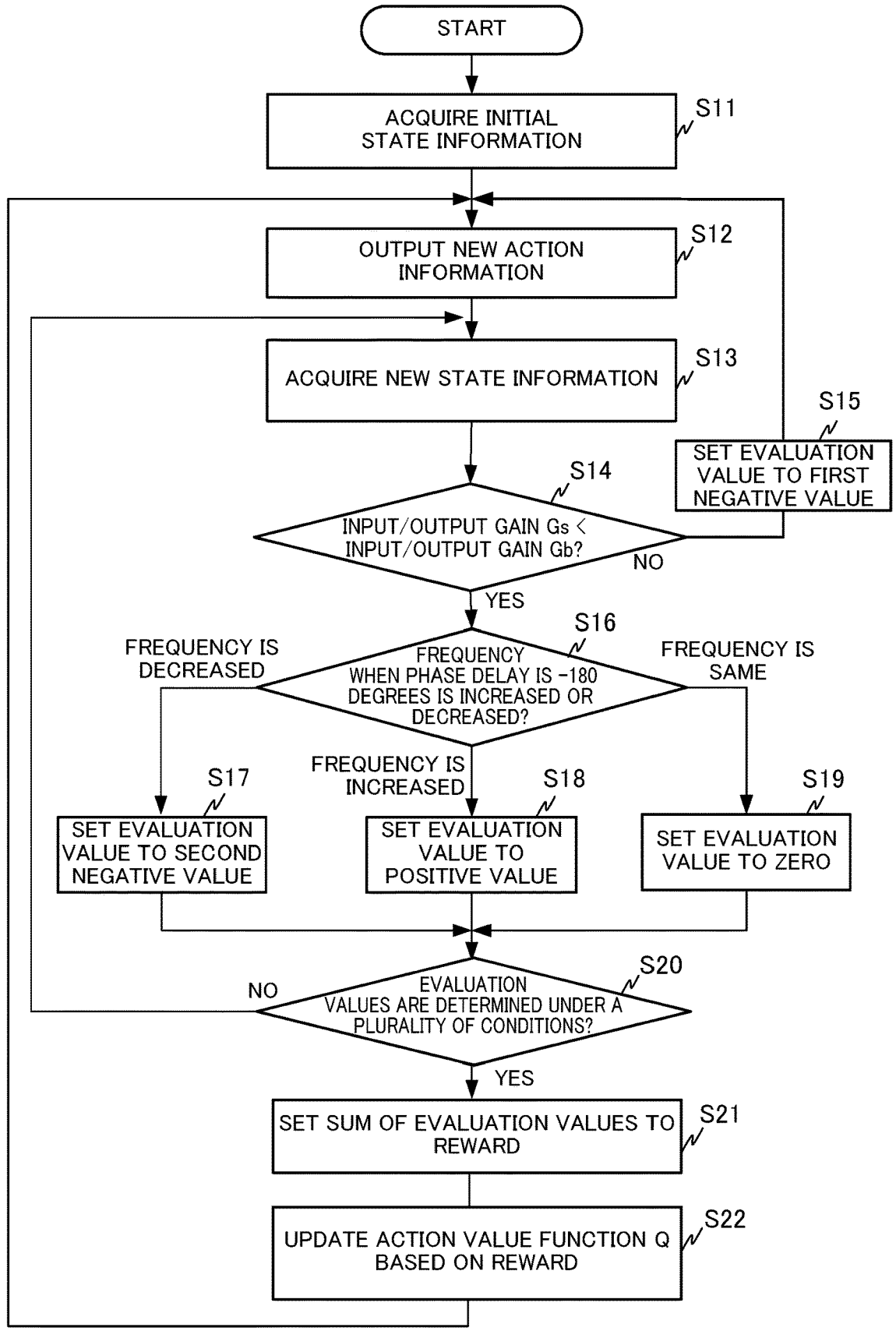
FIG. 15 is a flowchart showing the operation of the machine learning unit at the time of Q-learning in the present embodiment.

The operation of the machine learning unit 400 at the time of the Q-learning in the present embodiment will then be described with reference to the flowchart of FIG. 15.

In step S11, the state information acquisition unit 401 acquires the initial state information S from the servo control unit 100 and the frequency generation unit 200. The acquired state information is output to the value function updating unit 4022 and the action information generation unit 4023. As described above, the state information S is information which corresponds to a state in the Q-learning.

An input/output gain (amplitude ratio) $Gs(S_0)$ and a phase delay $D(S_0)$ under each of the conditions in a state $S_0$ at the time when the Q-learning is first started are obtained from the frequency characteristic calculation unit 300 by driving the servo control unit 100 with the velocity command which is the sinusoidal wave whose frequency is changed. The velocity command value and the velocity detection value are input to the frequency characteristic calculation unit 300, and the input/output gain (amplitude ratio) $Gs(S_0)$ and the phase delay $D(S_0)$ under each of the conditions output from the frequency characteristic calculation unit 300 are sequentially input to the state information acquisition unit 401 as the initial state information. The initial values of the coefficients $\omega_c$, $\tau$ and k of the transfer function for the filter 130 are generated beforehand by the user, and the initial values of the coefficients $\omega_c$, $\tau$ and k are fed to the state information acquisition unit 401 as the initial state information.

In step S12, the action information generation unit 4023 generates new action information A and outputs the generated new action information A to the filter 130 through the action information output unit 403. The action information generation unit 4023 outputs the new action information A based on the measures described above. The servo control unit 100 which has received the action information A drives the servo motor 150, with the velocity command which is the sinusoidal wave whose frequency is changed, based on the received action information in the state S' where the coefficients $\omega_c$, $\tau$ and k of the transfer function for the filter 130 related to the current state S are modified. As described above, this action information corresponds to the action A in the Q-learning.

In step S13, the state information acquisition unit 401 acquires, as new state information, the input/output gain (amplitude ratio) Gs(S'), the phase delay D(S') and the coefficients $\omega_c$, $\tau$ and k of the transfer function from the filter 130 in the new state S'. The acquired new state information is output to the reward output unit 4021.

In step S14, the reward output unit 4021 determines whether or not the input/output gain G(S') at each frequency in the state S' is equal to or less than the input/output gain Gb at each frequency in the standard model. When the input/output gain G(S') at each frequency is greater than the input/output gain Gb at each frequency in the standard model (no in step S14), in step S15, the reward output unit 4021 sets the evaluation value to the first negative value and returns to step S12.

When the input/output gain G(S') at each frequency in the state S' is equal to or less than the input/output gain Gb at each frequency in the standard model (yes in step S14), the reward output unit 4021 provides a positive evaluation value if the phase delay D(S') is less than the phase delay D(S), provides a negative evaluation value if the phase delay D(S') is greater than the phase delay D(S) or provides a zero evaluation value if the phase delay D(S') does not change when compared with the phase delay D(S). Although the method described previously is mentioned as a method of determining the evaluation value such that the phase delay is decreased, for example, there is no particular limitation to this method, and another method may be used.

In step S16, specifically, for example, when the state S is changed to the state S' in the phase diagram of FIG. 3, and the frequency at which the phase delay is 180 degrees is decreased, it is defined as phase delay D(S)<phase delay D(S'), and the reward output unit 4021 sets the evaluation value to the second negative value in step S17. The absolute value of the second negative value is set lower than the first negative value. When the state S is changed to the state S' and the frequency at which the phase delay is 180 degrees is increased, it is defined as phase delay D(S)>phase delay D(S'), and the reward output unit 4021 sets the evaluation value to a positive value in step S18. When the state S is changed to the state S' and the frequency at which the phase delay is 180 degrees is not changed, it is defined as phase delay D(S)=phase delay D(S'), and the reward output unit 4021 sets the evaluation value to a zero value in step S19.

When any one of steps S17, S18 and S19 is completed, in step S20, in step 20, whether or not the evaluation values are determined under a plurality of conditions is determined, and when the evaluation values are not determined under the conditions, that is, when there is one of the conditions under which the evaluation value is not determined, the process is returned to step S13, the condition is changed to the condition under which the evaluation value is not determined and thus the state information is acquired. When the evaluation values are determined under the conditions, in step S21, the evaluation values (evaluation values which are calculated in any one of steps S17, S18 and S19) which are determined under the individual conditions are added together, and the sum of the evaluation values is set to the reward. Then, in step S22, based on the value of the reward calculated in step S21, the value function updating unit 4022 updates the value function Q stored in the value function storage unit 404. Then, the process is returned to step S12 again, the processing described above is repeated and thus the value function Q converges to an appropriate value. The processing described above may be completed on the condition that the processing is repeated a predetermined number of times or is repeated for a predetermined time. Although on-line updating is illustrated in step S21, the on-line updating may be replaced with batch updating or mini-batch updating.

As described above, in the present embodiment, in the operation described with reference to FIG. 15, the machine learning unit 400 is utilized, and thus it is possible to obtain the appropriate value function for the adjustment of the coefficients $\omega_c$, $\tau$ and k of the transfer function for the filter 130, with the result that it is possible to simplify the optimization of the coefficients $\omega_c$, $\tau$ and k of the transfer function for the filter 130. An operation when optimization action information is generated with the optimization action information output unit 405 will be described next with reference to the flowchart of FIG. 16. In step S23, the optimization action information output unit 405 first acquires the value function Q stored in the value function storage unit 404. As described above, the value function Q has been updated by performing the Q-learning with the value function updating unit 4022.

In step S24, the optimization action information output unit 405 generates the optimization action information based on the value function Q, and outputs the generated optimization action information to the filter 130.

Figure 16:
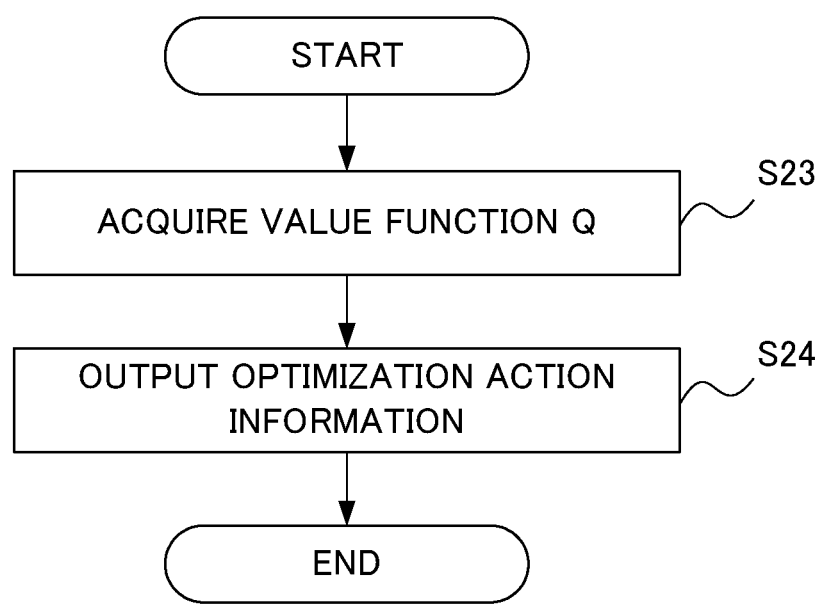
FIG. 16 is a flowchart illustrating the operation of an optimization action information output unit in the machine learning unit in the embodiment of the present invention.

In the present embodiment, by the operation described with reference to FIG. 16, it is possible to generate the optimization action information based on the value function Q determined by the learning with the machine learning unit 400, to simplify, based on the optimization action information, the adjustment of the coefficients $\omega_c$, $\tau$ and k of the transfer function for the filter 130 which are currently set, to reduce vibrations at the machine end and to enhance the quality of the machined surface of a work.

In the embodiment discussed above, a description is given using, as the example, the learning when the plurality of conditions (a), (b) and (c) discussed above and the frequency characteristic of the input/output gain and the phase delay are changed. However, the conditions of (a), (b) and (c) described above can also be combined as necessary so as to be learned by the machine learning unit 400. For example, although the frequency characteristic of the Y axis may be affected by the position of the Y axis itself, the position of the Z axis and the velocity gain of the servo control unit of the Z axis, they can be combined so as to set a plurality of conditions. Specifically, the machine learning unit 400 of the Y axis may combine a plurality of conditions as necessary among first multiple conditions of the positions of the left end, the center and the right end of the Y axis itself, second multiple conditions of the positions of the left end, the center and the right end of the Z axis and third multiple conditions of the velocity gain of the servo control unit of the Z axis so as to perform the learning.

The individual constituent units included in the control device described above can be realized by hardware, software or a combination thereof. A servo control method performed by cooperation of the individual constituent units included in the control device described above can also be realized by hardware, software or a combination thereof. Here, the realization by software means realization achieved by reading and executing programs with a computer.

The programs can be stored with various types of non-transitory computer readable media and supplied to the computer. The non-transitory computer readable media include various types of tangible storage media. Examples of the non-transitory computer readable medium include a magnetic recording medium (for example, a hard disk drive), a magneto-optical recording medium (for example, a magneto-optical disk), a CD-ROM (Read Only Memory), a CD-R, a CD-R/W and semiconductor memories (for example, a mask ROM, a PROM (Programmable ROM), an EPROM (Erasable PROM), a flash ROM and a RAM (Random Access Memory)). The programs may be supplied to the computer with various types of transitory computer readable media.

Although the embodiment described above is a preferred embodiment of the present invention, the scope of the present invention is not limited to only the embodiment described above, and various modifications can be practiced without departing from the spirit of the present invention.

Figure 17:
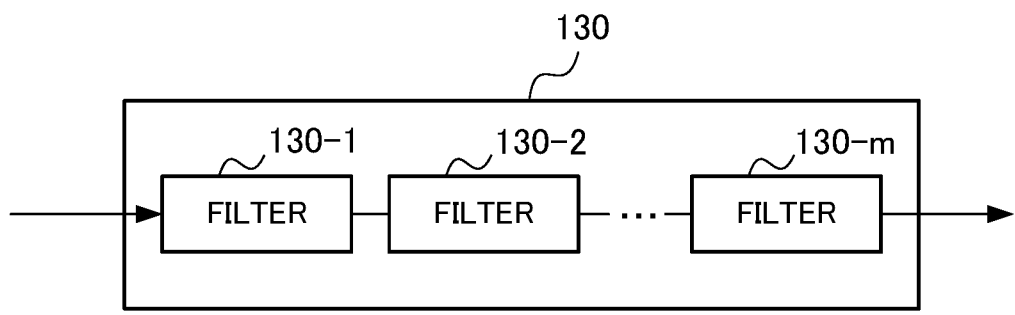
FIG. 17 is a block diagram showing an example where a plurality of filters are directly connected to form the filter.

Although in the embodiment discussed above, the case where the machine driven with the servo motor 150 has one resonance point is described, the machine may have a plurality of resonance points. When the machine has a plurality of resonance points, a plurality of filters are provided so as to correspond to the resonance points and are connected in series, and thus it is possible to attenuate all the resonance. FIG. 17 is a block diagram showing an example where a plurality of filters are directly connected to form the filter. In FIG. 17, when there are m (m is a natural number of two or more) resonance points, the filter 130 is formed by connecting m filters 130-1 to 130-m serially. Optimum values for attenuating resonance points are sequentially determined by machine learning with respect to the coefficients $\omega_c$, $\tau$ and k of the m filters 130-1 to 130-m.

The control device may also have the following configuration other than the configuration shown in FIG. 1.

<Variation Where Machine Learning Unit is Provided Outside Servo Control Unit>

Figure 18:
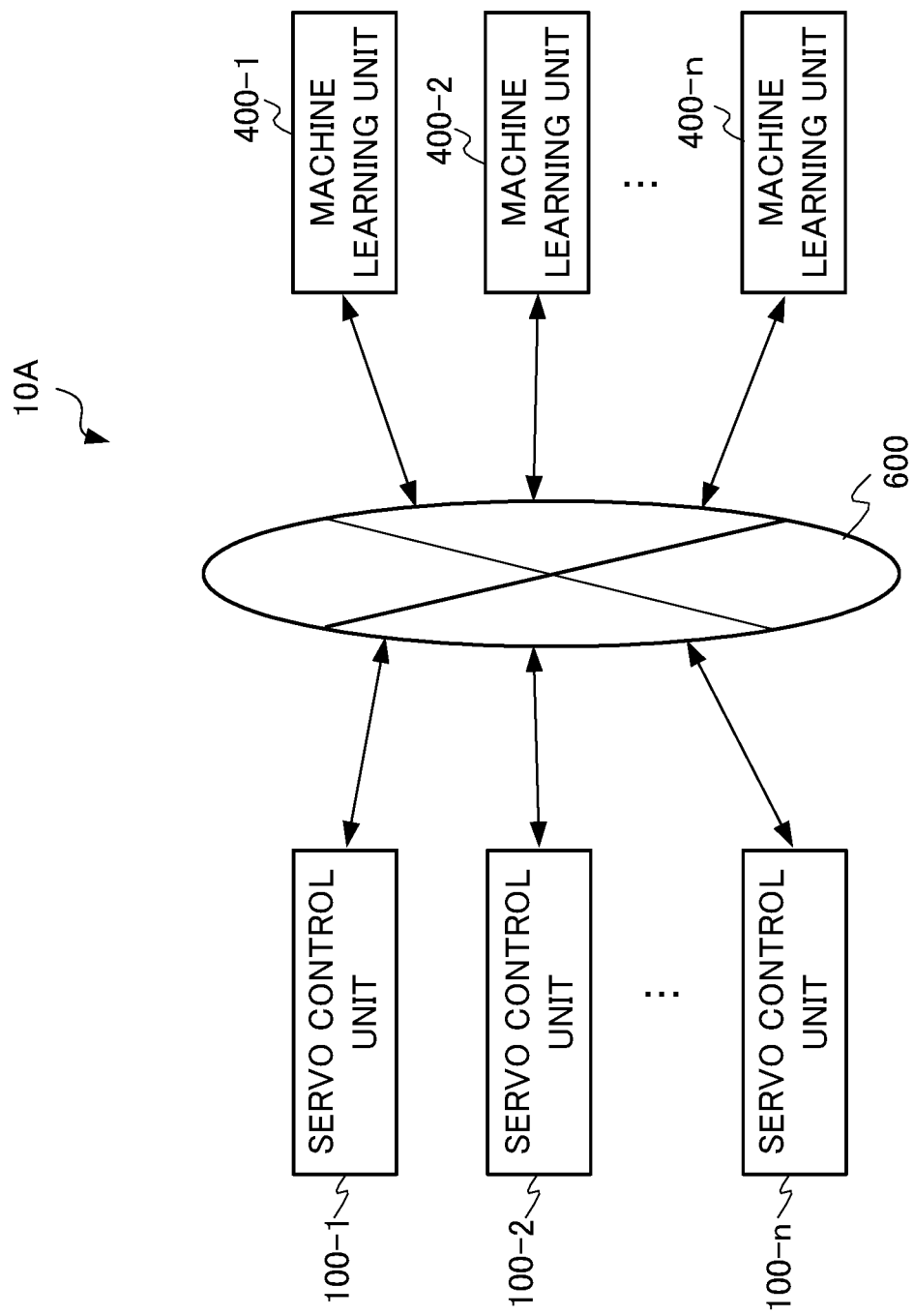
FIG. 18 is a block diagram showing another configuration example of the control device.

FIG. 18 is a block diagram showing another configuration example of the control device. The control device 10A shown in FIG. 18 differs from the control device 10 shown in FIG. 1 in that n (n is a natural number of two or more) servo control units 100A-1 to 100A-n are connected to n machine learning units 400A-1 to 400A-n through a network 600 and that each thereof includes the frequency generation unit 200 and the frequency characteristic calculation unit 300. The machine learning units 400A-1 to 400A-n have the same configuration as the machine learning unit 400 shown in FIG. 10. The servo control units 100A-1 to 100A-n each correspond to the servo control device, and the machine learning units 400A-1 to 400A-n each correspond to the machine learning device. One or both of the frequency generation unit 200 and the frequency characteristic calculation unit 300 may be naturally provided outside the servo control units 100A-1 to 100A-n.

Here, the servo control unit 100A-1 and the machine learning unit 400A-1 are paired one-by-one and are connected so as to be able to communicate with each other. The servo control units 100A-2 to 100A-n and the machine learning units 400A-2 to 400A-n are connected in the same manner as the servo control unit 100A-1 and the machine learning unit 400A-1. Although in FIG. 18, n pairs of the servo control units 100A-1 to 100A-n and the machine learning units 400A-1 to 400A-n are connected through the network 600, the n pairs of the servo control units 100A-1 to 100A-n and the machine learning units 400A-1 to 400A-n may be connected such that the servo control unit and the machine learning unit of each pair are directly connected through a connection interface. With respect to the n pairs of the servo control units 100A-1 to 100A-n and the machine learning units 400A-1 to 400A-n, for example, a plurality of pairs may be provided in the same factory or may be respectively provided in different factories.

The network 600 is, for example, a LAN (Local Area Network) constructed within a factory, the Internet, a public telephone network or a combination thereof. In the network 600, a specific communication method, whether the network 600 uses wired connection or wireless connection and the like are not particularly limited.

<Flexibility of System Configuration>

Although in the embodiment described above, the servo control units 100A-1 to 100A-n and the machine learning units 400A-1 to 400A-n are paired one-by-one and are connected so as to be able to communicate with each other, for example, a configuration may be adopted in which one machine learning unit is connected to a plurality of servo control units through the network 600 so as to be able to communicate therewith, and in which thus the machine learning is performed on the servo control units. In this case, a distributed processing system may be adopted in which the functions of the one machine learning unit are distributed to a plurality of servers as necessary. The functions of the one machine learning unit may be realized by utilization of a virtual server function or the like on a cloud.

When there are n machine learning units 400A-1 to 400A-n which respectively correspond to n servo control units 100A-1 to 100A-n of the same model name, the same specifications or the same series, the machine learning units 400A-1 to 400A-n may be configured to share the results of learning in the machine learning units 400A-1 to 400A-n. In this way, it is possible to construct a more optimum model.

The machine learning device, the control device and the machine learning method according to the present disclosure can take not only the embodiment described above but also various types of embodiments having configurations as described below.

(1) A machine learning device (machine learning unit 400) that performs reinforcement learning in which a servo control device (servo control unit 100) for controlling a motor (servo motor 150) is driven under a plurality of conditions and which optimizes a coefficient of at least one filter (filter 130) for attenuating at least one specific frequency component provided in the servo control device, the machine learning device including: a state information acquisition unit (state information acquisition unit 401) which acquires state information that includes the result of calculation of a frequency characteristic calculation device (frequency characteristic calculation unit 300) for calculating at least one of an input/output gain of the servo control device and a phase delay of an input and an output, the coefficient of the filter and the conditions; an action information output unit (action information output unit 403) which outputs, to the filter, action information including adjustment information of the coefficient included in the state information; a reward output unit (reward output unit 4021) which individually determines evaluation values under the conditions based on the result of the calculation so as to output, as a reward, the value of a sum of the evaluation values; and a value function updating unit (value function updating unit 4022) which updates an action value function based on the value of the reward output by the reward output unit, the state information and the action information. In the machine learning device described above, it is possible to perform the optimum adjustment of the filter characteristic even when the machine characteristic is changed depending on conditions, for example, even when the machine characteristic is changed depending on the position of one axis or even when the machine characteristic is affected by another axis.

(2) The machine learning device according to (1) described above in which the motor drives one axis in a machine tool, a robot or an industrial machine, and in which the conditions are a plurality of positions of the axis. In the machine learning device described above, it is possible to perform the optimum adjustment of the filter characteristic even when the machine characteristic is changed depending on a plurality of positions of one axis in a machine tool, a robot or an industrial machine.

(3) The machine learning device according to (1) described above in which the motor drives one axis in a machine tool, a robot or an industrial machine, and in which the conditions are a plurality of positions of another axis which is placed on the axis or is below the axis. In the machine learning device described above, it is possible to perform the optimum adjustment of the filter characteristic even when the machine characteristic is changed depending on a plurality of positions of another axis which is placed on one axis or is below the one axis in a machine tool, a robot or an industrial machine.

(4) The machine learning device according to (1) described above in which the motor drives one axis in a machine tool, a robot or an industrial machine, and in which the conditions are a plurality of velocity gains of the servo control device which drives another axis that is placed on the axis or is below the axis. In the machine learning device described above, it is possible to perform the optimum adjustment of the filter characteristic even when the machine characteristic is changed depending on a plurality of velocity gains of the servo control device that drives another axis which is placed on one axis or is below the one axis in a machine tool, a robot or an industrial machine.

(5) The machine learning device according to any one of (1) to (4) described above in which the frequency characteristic calculation device uses a sinusoidal input signal whose frequency is changed and velocity feedback information of the servo control device so as to calculate at least one of the input/output gain and the phase delay of the input and the output.

(6) The machine learning device according to any one of (1) to (5) described above in which a weight for each of the evaluation values is set according to each of the conditions. In the machine learning device described above, even when influences of the individual conditions exerted on the machine characteristic are different from each other, the weight for each of the evaluation values can be set according to the degree of the influence.

(7) The machine learning device according to any one of (1) to (6) described above including: an optimization action information output unit (optimization action information output unit 405) which outputs the adjustment information of the coefficient based on the value function updated by the value function updating unit.

(8) A control device including: the machine learning device (machine learning unit 400) according to any one of (1) to (7) described above; the servo control device (servo control unit 100) which includes the at least one filter for attenuating the at least one specific frequency component and which controls the motor; and the frequency characteristic calculation device (frequency characteristic calculation unit 300) which calculates the at least one of the input/output gain of the servo control device and the phase delay of the input and the output in the servo control device. In the control device described above, it is possible to perform the optimum adjustment of the filter characteristic even when the machine characteristic is changed depending on conditions, for example, even when the machine characteristic is changed depending on the position of one axis or even when the machine characteristic is affected by another axis.

(9) A machine learning method of a machine learning device (machine learning unit 400) that performs reinforcement learning in which a servo control device (servo control unit 100) for controlling a motor (servo motor 150) is driven under a plurality of conditions and which optimizes a coefficient of at least one filter (filter 130) for attenuating at least one specific frequency component provided in the servo control device, the machine learning method including: acquiring state information that includes the result of calculation for calculating at least one of an input/output gain of the servo control device and a phase delay of an input and an output, the coefficient of the filter and the conditions; outputting, to the filter, action information including adjustment information of the coefficient included in the state information; individually determining evaluation values under the conditions based on the result of the calculation so as to determine, as a reward, the value of a sum of the evaluation values; and updating an action value function based on the value of the reward determined, the state information and the action information. In the machine learning method described above, it is possible to perform the optimum adjustment of the filter characteristic even when the machine characteristic is changed depending on conditions, for example, even when the machine characteristic is changed depending on the position of one axis or even when the machine characteristic is affected by another axis.

EXPLANATION OF REFERENCE NUMERALS 10, 10A control device
100, 100-1 to 100-*n* servo control unit
110 subtractor
120 velocity control unit
130 filter
140 current control unit
150 servo motor
200 frequency generation unit
300 frequency characteristic calculation unit
400 machine learning unit
400A-1 to 400A-n machine learning unit
401 state information acquisition unit
402 learning unit
403 action information output unit
404 value function storage unit
405 optimization action information output unit
500 control target
600 network

What is claimed is:

1. A machine learning device that performs reinforcement learning in which a servo control device for controlling a motor is driven under a plurality of conditions and which optimizes a coefficient of at least one filter for attenuating at least one specific frequency component provided in the servo control device, the machine learning device comprising:
    a state information acquisition unit which acquires state information that includes a result of calculation of a frequency characteristic calculation device for calculating at least one of an input/output gain of the servo control device and a phase delay of an input and an output, the coefficient of the filter and the conditions;
    an action information output unit which outputs, to the filter, action information including adjustment information of the coefficient included in the state information;
    a reward output unit which individually determines evaluation values under the conditions based on the result of the calculation so as to output, as a reward, a value of a sum of the evaluation values;
    a value function updating unit which updates a value function based on a value of the reward output by the reward output unit, the state information and the action information; and
    an optimization action information output unit which outputs, to the filter, the adjustment information for optimizing the coefficient based on the value function updated by the value function updating unit.

2. The machine learning device according to claim 1, wherein the motor drives one axis in a machine tool, a robot or an industrial machine, and
    the conditions are a plurality of positions of the axis.

3. The machine learning device according to claim 1, wherein the motor drives one axis in a machine tool, a robot or an industrial machine, and
    the conditions are a plurality of positions of another axis which is placed on the axis or is below the axis.

4. The machine learning device according to claim 1, wherein the motor drives one axis in a machine tool, a robot or an industrial machine, and
    the conditions are a plurality of velocity gains of the servo control device which drives another axis that is placed on the axis or is below the axis.

5. The machine learning device according to claim 1, wherein the frequency characteristic calculation device uses a sinusoidal input signal whose frequency is changed and velocity feedback information of the servo control device so as to calculate at least one of the input/output gain and the phase delay of the input and the output.

6. The machine learning device according to claim 1, wherein a weight for each of the evaluation values is set according to each of the conditions.

7. A control device comprising: the machine learning device according to claim 1;
    the servo control device which includes the at least one filter for attenuating the at least one specific frequency component and which controls the motor; and
    the frequency characteristic calculation device which calculates the at least one of the input/output gain of the servo control device and the phase delay of the input and the output in the servo control device.

8. A machine learning method of a machine learning device that performs reinforcement learning in which a servo control device for controlling a motor is driven under a plurality of conditions and which optimizes a coefficient of at least one filter for attenuating at least one specific frequency component provided in the servo control device, the machine learning method comprising:
- acquiring state information that includes a result of calculation for calculating at least one of an input/output gain of the servo control device and a phase delay of an input and an output, the coefficient of the filter and the conditions;
- outputting, to the filter, action information including adjustment information of the coefficient included in the state information;
- individually determining evaluation values under the conditions based on the result of the calculation so as to determine, as a reward, a value of a sum of the evaluation values;
- updating a value function based on a value of the reward determined, the state information and the action information; and
- outputting, to the filter, the adjustment information for optimizing the coefficient based on the value function updated.

* * * * *